United States Patent
Cummins et al.

(10) Patent No.: US 12,088,626 B2
(45) Date of Patent: Sep. 10, 2024

(54) VISUALIZING FIREWALL-PERMITTED NETWORK PATHS FOR ASSESSING SECURITY OF NETWORK CONFIGURATION

(71) Applicant: CybernetIQ, Inc., Ottawa (CA)

(72) Inventors: Joseph Cummins, Ottawa (CA); Jonathan Wong, Ottawa (CA)

(73) Assignee: CybernetIQ, Inc.

( * ) Notice: Subject to any disclaimer, the term of this patent is extended or adjusted under 35 U.S.C. 154(b) by 241 days.

(21) Appl. No.: 17/420,571

(22) PCT Filed: Jan. 20, 2020

(86) PCT No.: PCT/CA2020/050002
§ 371 (c)(1),
(2) Date: Jul. 2, 2021

(87) PCT Pub. No.: WO2020/140153
PCT Pub. Date: Jul. 9, 2020

(65) Prior Publication Data
US 2022/0116423 A1    Apr. 14, 2022

Related U.S. Application Data

(60) Provisional application No. 62/821,174, filed on Mar. 20, 2019, provisional application No. 62/788,301, filed on Jan. 4, 2019.

(51) Int. Cl.
*H04L 9/40* (2022.01)
*G06F 3/0484* (2022.01)

(52) U.S. Cl.
CPC ............ *H04L 63/20* (2013.01); *G06F 3/0484* (2013.01); *H04L 63/0263* (2013.01); *H04L 63/101* (2013.01)

(58) Field of Classification Search
CPC ... H04L 63/20; H04L 63/0263; H04L 63/101; G06F 3/0484
See application file for complete search history.

(56) References Cited

U.S. PATENT DOCUMENTS

| | | |
|---|---|---|
| 6,900,822 B2 | 5/2005 | Germain et al. |
| 7,096,502 B1 | 8/2006 | Fox et al. |

(Continued)

FOREIGN PATENT DOCUMENTS

| | | |
|---|---|---|
| WO | 2015168902 A1 | 11/2015 |
| WO | 2018094516 A1 | 5/2018 |

OTHER PUBLICATIONS

Andress., "The Basics of Information Security: Understanding the Fundamentals of InfoSec in Theory and Practice", 2nd Edition, Jun. 2014, Elsevier: Oxford, 240 pages.

(Continued)

*Primary Examiner* — Nelson S. Giddins
(74) *Attorney, Agent, or Firm* — Borden Ladner Gervais LLP; Jason Mueller-Neubaus

(57) ABSTRACT

A computer-implemented method of generating in a display a dynamic accessibility diagram representing a firewall configuration of a firewall in a computer network. A computer generates in the display a pair of concentric rings representing the firewall, including outer and inner concentric rings each having segments respectively representing remote address ranges and local address ranges of the ACL rules. Selection of a segment causes generation of an accessibility curve between the selected segment and a pairing segment, thereby graphically representing accessibility between the corresponding remote and local address ranges.

20 Claims, 12 Drawing Sheets

(56) References Cited

U.S. PATENT DOCUMENTS

| | | | |
|---|---|---|---|
| 9,350,622 B2 | 5/2016 | Smith et al. | |
| 9,942,252 B1 | 4/2018 | Kondaveeti et al. | |
| 2007/0209058 A1* | 9/2007 | Anantharamiah | H04L 63/0272 |
| | | | 726/1 |
| 2018/0270198 A1* | 9/2018 | Wood | H04L 63/0263 |
| 2019/0014086 A1* | 1/2019 | Meyer | H04L 63/0236 |
| 2020/0162315 A1* | 5/2020 | Siddiqi | H04L 41/0677 |

OTHER PUBLICATIONS

International Patent Application No. PCT/CA2020/050002, International Preliminary Report on Patentability dated Jun. 16, 2021.
International Patent Application No. PCT/CA2020/050002, International Search Report and Written Opinion dated Mar. 20, 2020.

\* cited by examiner

905 { 906

| Remote Addresses/Ports |
|---|
| 0.0.0.0/0 |
| Local Addresses/Ports |
| 172.18.71.192/26 |
| 172.18.71.128/26 |
| 0.0.0.0/0 |
| 172.18.64.0/26 |
| Direction |
| Both |

907 — Remote Addresses/Ports
909 — Local Addresses/Ports
911 — Direction

| Remote Addresses/Ports |
|---|
| 192.168.1.1/0 |
| Local Addresses/Ports |
| 157.547.2.0 |
| Direction |
| Both |

| Remote Addresses/Ports |
|---|
| 192.168.3.0/0 |
| Local Addresses/Ports |
| 157.547.2.0 |
| Direction |
| Both |

VISUALIZING FIREWALL-PERMITTED NETWORK PATHS FOR ASSESSING SECURITY OF NETWORK CONFIGURATION

FIELD

The present disclosure relates generally to computer network security configuration visualization and control.

BACKGROUND

Computer network security is an increasingly complex and consequential issue. As progressively more and more sensitive and valuable activity is performed using computers and computer networks—for example, online banking, electronic medical records, confidential communications—the incentive for infiltration and criminal use of such information also grows accordingly. As the complexity of computer networks, and their use, and the diversity of users, increases, so does the difficulty involved in configuring the networks properly and sufficiently to safeguard sensitive information.

To this end, it is now commonplace for computer network managers to formulate network security policies which define the sensitivity of different entities and elements in the computer network. Numerous security policy models are used, including confidentiality models such as the Bell-La Padula model, and integrity models such as the Biba or Clark-Wilson model. In any event, the operational technology of the network is then configured with the intention to give effect to the security policy. For example, if a security policy designates two entities in the network in such a way that communication between them should be prevented, then it is desirable for the configuration of the technology in the network to operate so as to prevent such communication. If the technology permits such communication, then it fails correctly to implement the security policy, and a security weakness exists in the network.

A chronic difficulty, however, is that the complexity of security technology implemented in modern computer networks renders reliable characterization of the total, as well as particulate, security configuration of the network extremely difficult, if not impossible. In other words, it is generally not possible to determine without immense time and effort whether the combination of the configurations of all of the different entities in the network is such that they would together operate consistently with the security policy. In other words, it is often the case that despite diligent effort, the actual configuration of a network does not accurately implement the defined security policy, with the result that access to some sensitive entities is permitted where it should be prevented.

Numerous solutions to this problem have been proposed. Some proposed solutions create a model of the computer network and then analyze the model to determine the security posture of the network. For example, U.S. Pat. No. 7,096,502 teaches a similar solution. One problem with such solutions concerns the complexity of the network and of the analysis required to identify and represent to a user such as a network administration information which is relevant at any given moment, and useful to identify and remedy specific existing defects in the network security configuration, without overwhelming the user with the volume or complexity of information presented.

Some other solutions have attempted to address this problem by providing means to visualize aspects of communication in a network. For example, U.S. Pat. No. 6,900,822 teaches a system and method for visually representing performance and flow analysis of a communication network having devices connected by links. U.S. Pat. No. 9,350,622 teaches a graphical network topology along with a graphical transmission of a transmission path of a network flow involving a particular device in real time.

While these known solutions provide some assistance, there remains a pressing need to provide yet further solutions which conveniently and readily enable users, such as network security administrators, to assess the security configuration of computer networks and to detect defects inconsistent with security policies.

BRIEF DESCRIPTION OF THE DRAWINGS

Embodiments will now be described, by way of example only, with reference to the attached Figures.

FIGS. 10-12 are schematic drawings of firewall ACL rules.

DESCRIPTION

Figure 1:
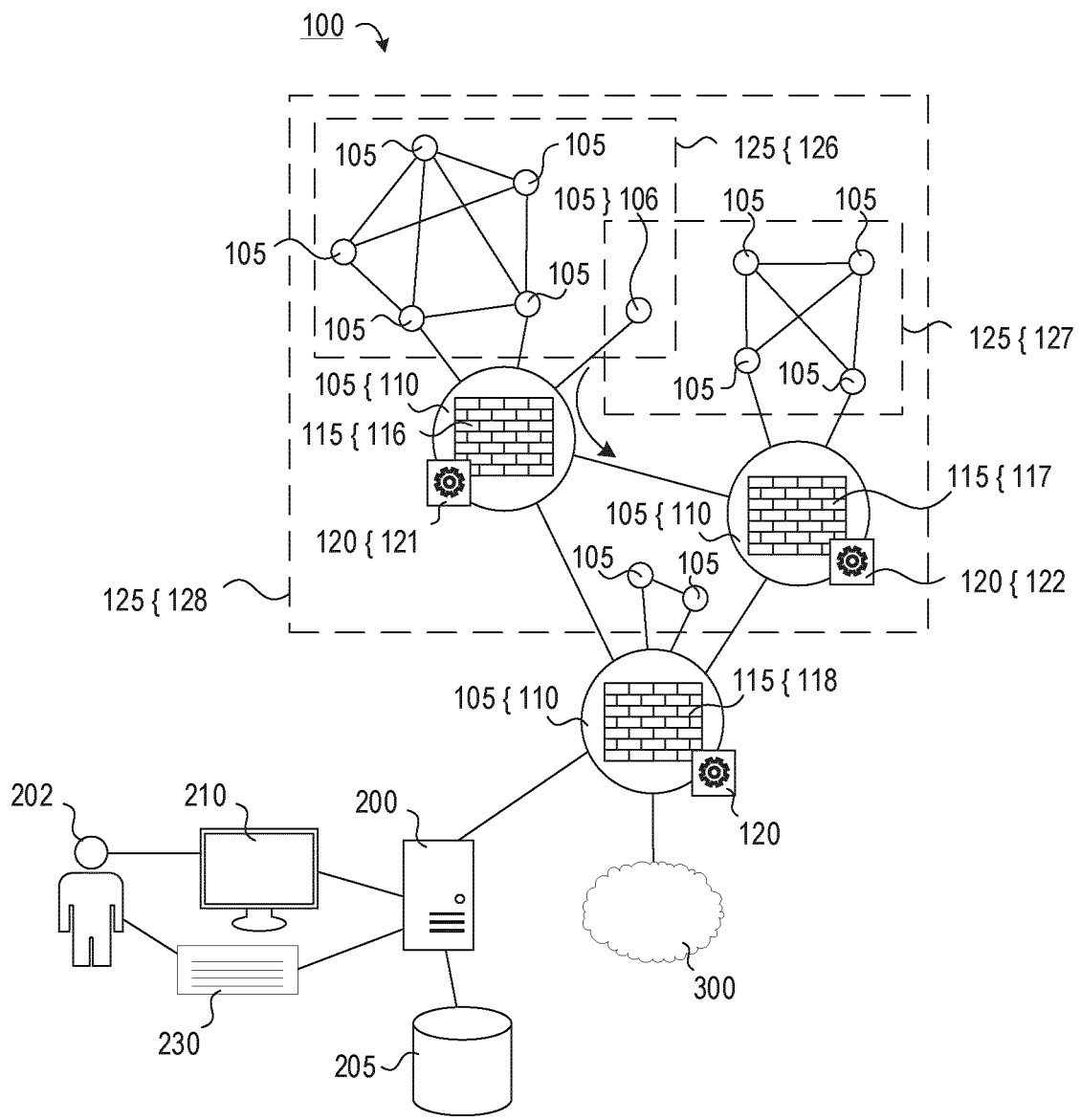
FIG. 1 is schematic diagram of a system of a computer network and a computing device and peripherals configured to assess a security configuration of the computer network and to detect defects inconsistent with a security policy.

In order to provide a means to enable a user, such as a network security administrator, to assess the security configuration of a computer network and to detect defects inconsistent with a security policy, a computing device may be configured to receive firewall configurations from security appliances of the computer network, generate standardized firewall configurations, receive node security sensitivity values based on the network security policy, monitor network traffic, generate a network security configuration based on the received and generated configuration information, and generate a visual representation of the network security configuration which enables the user readily to comprehend the network security configuration and detect defects including specifically instances where the network security configuration does not correctly implement the network security policy.

As used herein, the term "network node", or simply "node", is an electronic device configured to create and communicate information encoded in signals over an electronic or electromagnetic communications channel. Depending on context, a node may include data communication equipment, such as a network modem, hub, bridge, or switch, or may include data terminal equipment such as a personal electronic device (telephone or smartphone handset), a printer, a host computer, such as a router, a workstation, or a server. In some contexts, a node may designate an addressable network interface, such that a single piece of physical network equipment possessing multiple network interfaces may constitute a like number of nodes.

As used herein, the term "computer appliance", or simply "appliance", is a separate and discrete hardware device with integrated software (e.g. firmware) that is designed to provide a specific computing resource. Computer appliances include, but need not be limited to, "storage appliances", "network appliances", and "special-purpose appliances". Storage appliances are appliances which provide mass storage resources for one or more network-attached systems. Network appliances include appliances which provide networking resources including, but not limited to, network routers and "security appliances".

Security appliances generally include appliances designed to protect computer networks from unwanted traffic, and may include: active devices which block or otherwise control network traffic (e.g. firewalls, anti-virus scanning devices, and content filtering devices); passive devices which detect, monitor, and report on network traffic (e.g. intrusion detection appliances, traffic monitoring devices); preventative devices which scan networks and identify potential security problems; and unified threat management ("UTM") appliances which combine more than one of the foregoing resources in a single appliance. Contemporary examples of security appliances include CISCO Systems PIX™ firewall and Cyberoam™ UTM appliances, and Palo Alto PA-7000™ Series Next-Generation™ firewall appliances.

A "network security policy" or "security policy" is a definition of desired constraints on the behaviour of entities in a computer network and may include specifications of the limitations imposed on each entity which are considered to render it secure in view of its intended role. For example, a server or a storage device intended to store or process highly sensitive information may be defined as possessing a higher degree of sensitivity relative to a workstation intended for use to access only information of low sensitivity. Numerous security policy models are useful, including confidentiality models such as the Bell-La Padula model, and integrity models such as the Biba or Clark-Wilson model.

In particular, a security policy may assign to one or more nodes in the computer network a security sensitivity value reflecting a security sensitivity of the node. For example, the security sensitivity values may specify a ranking reflecting desired limitations on the ability of the corresponding network nodes to communicate with one another.

With reference to FIG. 1, a computer network 100 may include a plurality of network nodes 105, some of which may be network appliances. The network nodes 105 including the network appliances may be interconnected in any known network configuration including without limitation star topography (master/slave relationship), ring topography, common bus/"flat" topography (each node has an equal priority), mesh topography (semi-interconnected), and fully connected topography. At least some of the network appliances may be security appliances 110, and at least some of the security appliances 110 may operate respective firewalls 115 in accordance with respective firewall configurations 120 specified in corresponding firewall configuration files. More generally, a security appliance 110 may be configured with a security configuration, which may include a firewall configuration when the security appliance 110 operates a firewall 115.

For each security appliance 110 that operates a firewall 115, the corresponding firewall configuration 120 may be of a corresponding firewall configuration type. For example, each firewall configuration 120 may include firewall configuration parameters, and these may be differently represented, or organized, or encoded for each of the different firewall configuration types. In many cases, configuration files may be written in a vendor specific programming language, and configuration files of different types may be written in different programming languages, sometimes dependent upon or proprietary to the original equipment manufacturer (OEM) of the security appliance operating the firewall. This is illustrated in a comparison between CISCO™ firewall syntax and FORTINET™. For example, both use source and destination routing, however one vendor uses "sourceip" and the other uses the shorthand "src-ip". Variations of this sort are widely detailed and have fragmented the industry to require specific certifications and understanding of specific features to be able to use these systems effectively. Where the computer network 100 includes a plurality of security appliances 110 operating firewalls having corresponding firewall configurations 120, the firewall configurations 120 may include a first firewall configuration 121 of a first firewall configuration type, and may also include a second firewall configuration 122 of a second firewall configuration type, and so on.

The computer network 100 may be interconnected hierarchically such that communication of one node 105 with another node 105 in the computer network 100, or outside of the computer network 100, may require mediation by one or more security appliances 110 operating a firewall 115. For example, traffic between the two nodes 105 may require routing by one or more security appliances 110. As such, communication of a node 105 with another internal node 105, or outside of the network 100, may be permitted, blocked, or generally regulated in accordance with the firewall configurations 120 or appropriate policies of the firewalls 115 operated by the intervening security appliances 110. For example, for a given node 105, the firewall configuration 120 of a firewall 115 in a link path from that node 105 to another node 105 may include rule sets that allow or block communication. Such rule sets may be defined based on any relevant parameters including, for example, allowed or blocked internet protocol (IP) address ranges, network port ranges, network protocols, and media access control (MAC) addresses. Likewise, many advanced network appliances 110 can understand and interrupt attempts at leveraging the system limitations to block attempts at communication, or deny traffic to specific types of Domain Name System (DNS) providers. Further still, "deep packet inspection" firewalls can evaluate the configuration and length of communication for potential implication of malicious communication, or even eliminate attempts at communication using obfuscated or encrypted techniques.

The nodes 105 whose communication with other internal nodes 105 in the network 100, or outside the network 100, is regulated by a common firewall 115 may all be considered to be 'behind' the firewall 115, and by virtue of this relationship may be considered to constitute a "security enclave" 125, or "enclave", inasmuch as the firewall configuration 120 of the common firewall 115 commonly governs communication of the nodes 105 in the enclave 125 with nodes 105 outside of the enclave 125. Such an enclave 125 may also be regarded as a security virtual local area network (VLAN) or network segment implemented through selective configuration of the security appliance firewalls 115.

Such security enclaves 125 may be nested, such as when a first group of nodes 105 are behind a first firewall 116, a second group of nodes 105 are behind a second firewall 117, and both the first and second groups of nodes 105 are behind a third firewall 118. In such case, the first group of nodes 105 may constitute a first enclave 126, the second group of nodes 105 may constitute a second enclave 127, and the first and second groups of nodes 105 may constitute a third enclave 128 containing both the first 126 and second enclaves 127. It is also possible for security enclaves 125 to overlap without nesting, such as when as when a first group of nodes 105 are behind a first firewall 126, a second group of nodes 105 are behind a second firewall 127, and at least one of the nodes 106 of the first and second groups is behind both the first firewall 116 and the second firewall 117. Such redundancy ensures that should a first appliance 110 be compromised or corrupted that other appliances 110 are available to correct, failsafe, or share the responsibility of protection of those sensitive enclaves 125.

Thus, by virtue of the collective operation of all of the firewalls 115 in the available link paths between a given node 105 and another node 105 in the network 100, some form of communication between the nodes 105 may be permitted. In such case, one of the nodes 105 may be said to be "accessible" by the other node 105. Depending on the particular firewall configurations 120 of the intervening firewalls 115 in a link path, such accessibility may be symmetrical, in that the conditions for access by the given node to the other node are the same for access by the latter to the former, or the accessibility may be asymmetrical, in that the conditions for access by the given node to the other node are different for access by the latter to the former, if at all.

One or more of the nodes 105 may also be characterized by a security sensitivity value (not shown). Each of the nodes 105 so characterized may be assigned a corresponding security sensitivity value, and the security sensitivity values may be stored in a data storage 205 which may be accessible by a computing device 200 to assign and store the security sensitivity values, or to retrieve them for display on a display 210, or to modify them. For example, the security sensitivity values may specify a ranking corresponding to a security policy reflecting intended limitations on the ability of the corresponding network nodes to communicate with one another. For example, an assignment of a relatively higher security sensitivity value to a first node and a relatively lower security sensitivity value to a second node may indicate a policy that while the first node is intended to be capable of initiating communication with the second node, the second node is intended to be blocked from initiating communication with the first node. One non-limiting example of security sensitivity values includes Cisco™ ASA Security levels (see, e.g. J. Andress, *The Basics of Information Security: Understanding the Fundamentals of InfoSec in Theory and Practice,* 2nd Edition, (Elsevier: Oxford, 2014)). In accordance with this scheme, a first interface assigned a higher security level is generally permitted to initiate access to a second interface assigned a lower security level, and the second interface is permitted to reply to that access. Access from the second interface to the first interface, however, is generally prohibited or requires an exception to the general policy. Other configurations are possible. These include lower security levels that unidirectionally "push", or transmit without successful acknowledgement, higher security zones that "pull" or access information without authentication or monitoring, and lastly two separate zones that transmit on predefined separate ports in a push configuration that are used to communicate.

Figure 2:
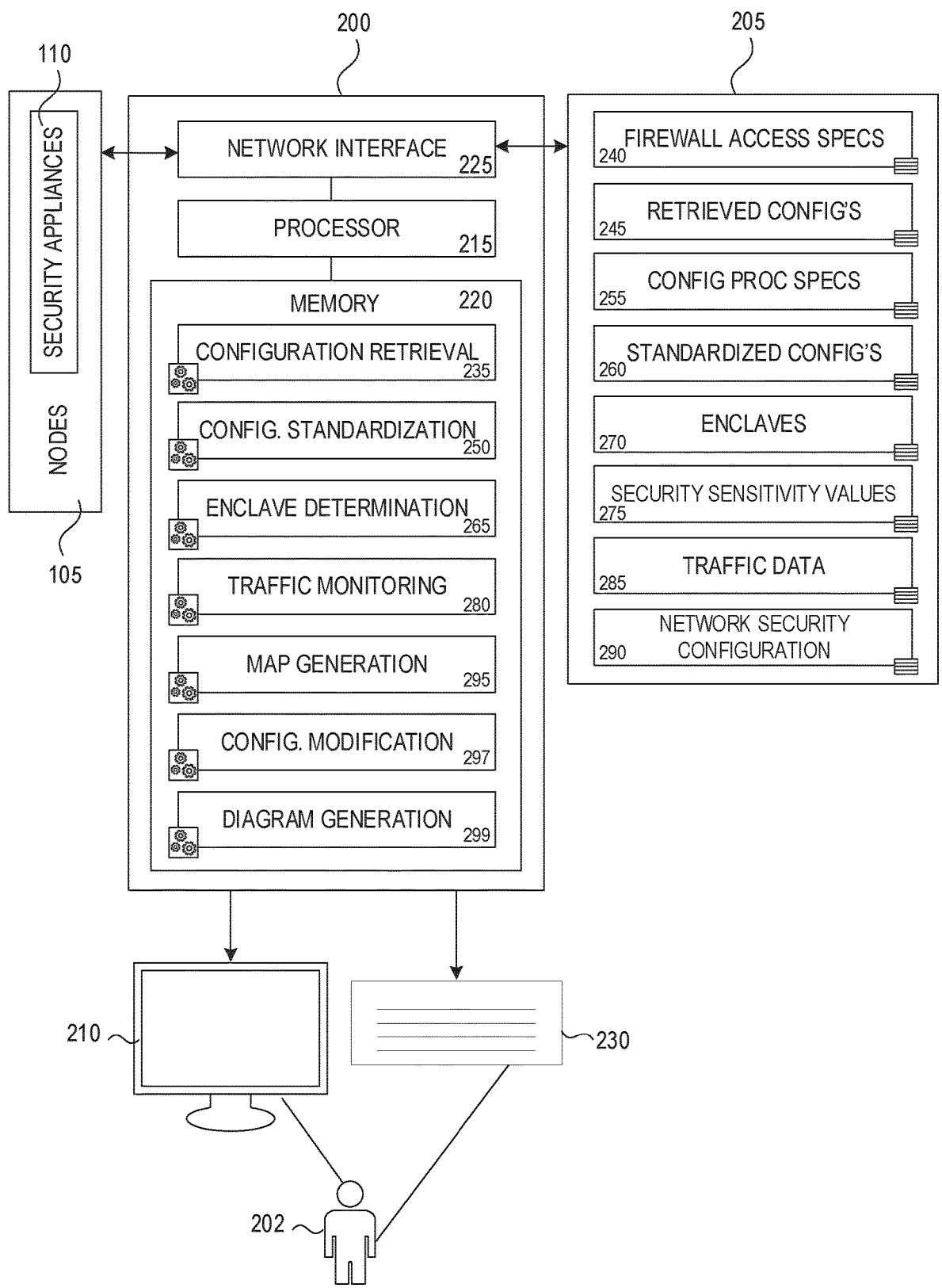
FIG. 2 is a schematic diagram of a configuration of the system of FIG. 1.
Figure 3:
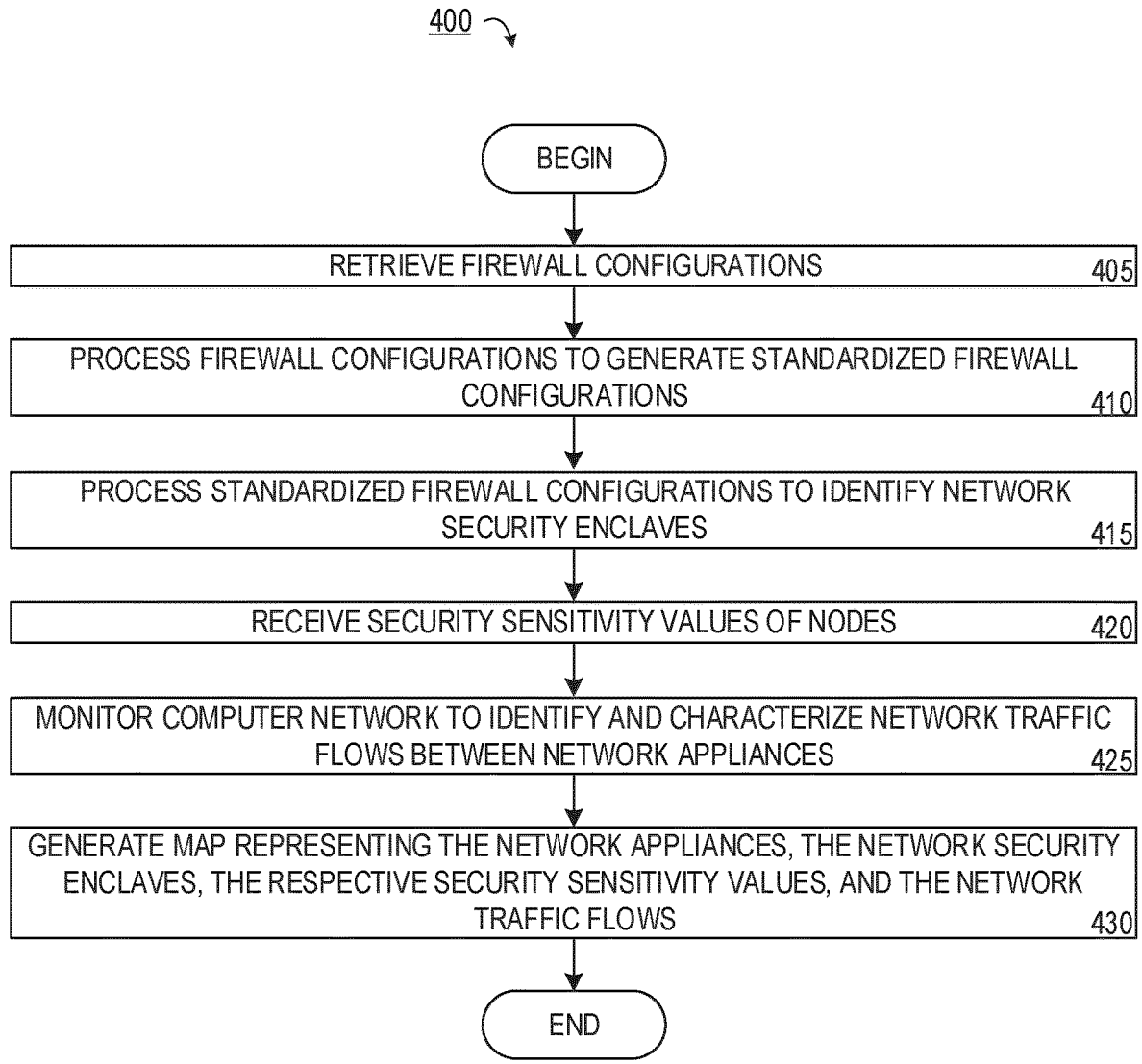
FIG. 3 is a flowchart of a method for assessing the security configuration of the computer network and to detect defects inconsistent with the security policy.
Figure 6:
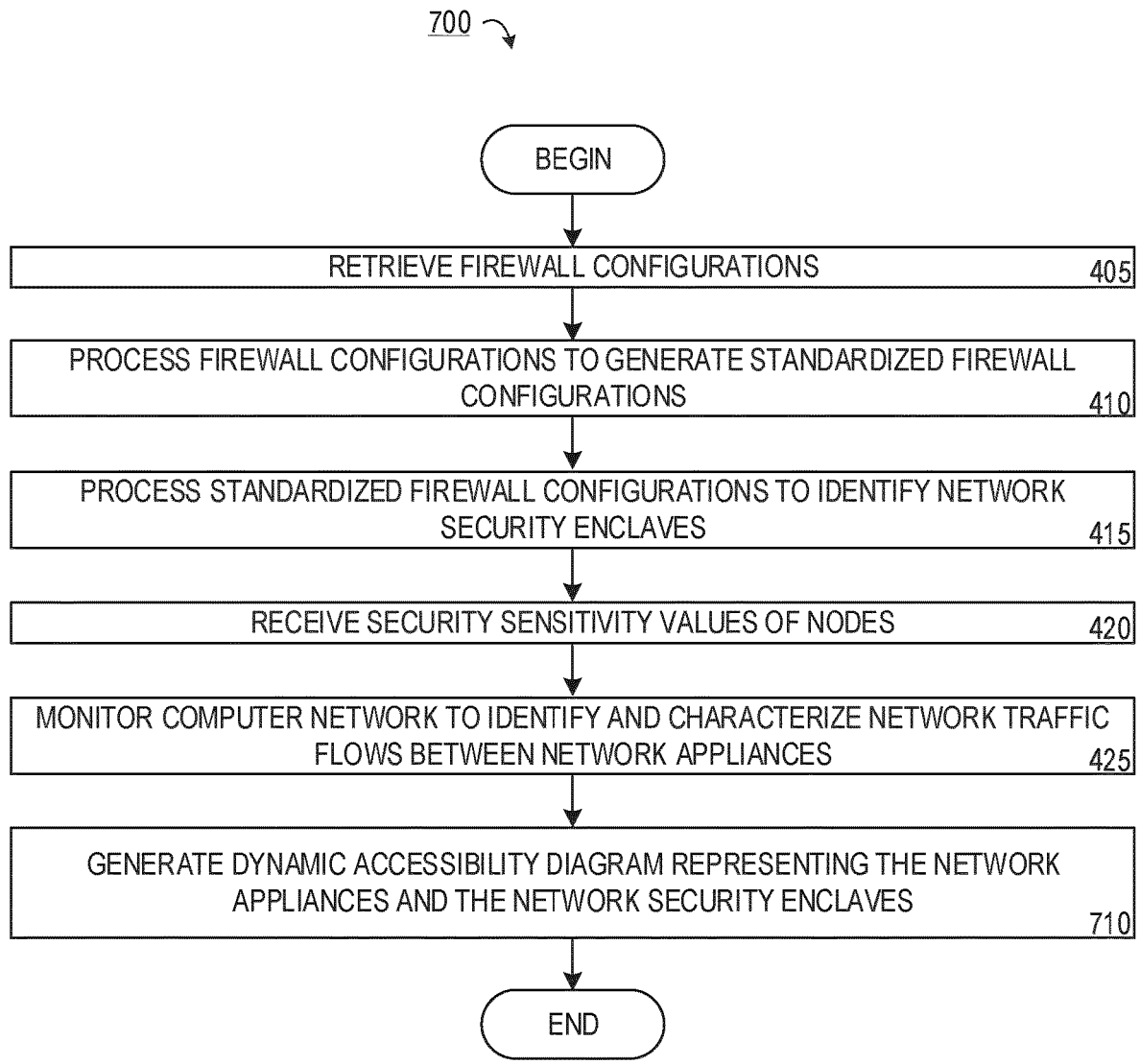
FIG. 6 is a flowchart of a method for generating a dynamic accessibility diagram representing a network security configuration of a computer network.

In view of the above network configuration, and with reference to FIG. 2, a computing device 200 may be configured to monitor the computer network 100, and generate a map in a display 210 representing a network security configuration of the computer network 100. A corresponding method 400 is shown in FIG. 3. The computing device 200 may also be configured to generate a dynamic accessibility diagram in the display 210 representing accessibility between particular selected nodes 105 in the network 100. A corresponding method 700 is shown in FIG. 6. The computing device 200 may have a processor 215, a memory 220, and a network interface 225, and may include or interface a user interface 230 and a display 210. The memory 220 may store computer-readable instructions executable by the processor 215 to perform the methods and functions described herein. The computing device 200 may include or interface a storage device, which may include a database 205, as described herein. The network interface 225 may be wired or wireless, for interfacing the computer network 100, and may also access another network such as the Internet 300.

In particular, and as shown in FIG. 2, the computing device 200 may be configured with a number of components or modules, each of which is configured to perform certain, specific functions as described herein. Each module may include corresponding computer-readable instructions stored in the memory 220 and executable by the processor 215 to perform the corresponding functions described herein using the network interface 225, user interface 230, display 210, and/or storage device 205. Each module may additionally or alternatively include any desired combination of hardware and software or other means to perform such functions. The computing device 200 may include or interface with the storage device 205 to retrieve or process data as described herein, and as shown in FIG. 2 the storage device 205 may be configured with specific data structures to store each respective category of data.

As discussed above, the computer network 100 may comprise a plurality of network appliances 110 which may also be security appliances configured with an appliance security configuration. Each of the security appliances 110 may be accessed to provide the appliance security configuration of the security appliance. For example, one or more of the security appliances may be accessed by a configuration retrieval module 235, which may include a script, of the computing device 200 over the network interface 225, or by another means. The configuration retrieval module 235 may be configured in parallel with a security scanner to discover hosts and services in the computer network, which may include for example the Nmap scanner available at https://nmap.org. Various security scanners may collect network data from the computer network 100 including for example open ports, IP addresses, network interface controller (NIC) data, service data, common vulnerabilities and exposures (CVE) data, and MAC addresses. The data so collected may be stored by the computing device 200 in the storage device 205 using a specific format for later retrieval. In this manner, the computing device 200 may discover nodes 105, including security appliances 110, in the network. One or more of the appliance security configurations may include a firewall configuration 120. Thus, accessing the network appliances 110 to provide the appliance security configurations may provide a respective plurality of firewall configurations 120.

The different security appliances 110 may include a number of different security appliance types, and may require correspondingly different inputs in order to retrieve the firewall configuration 120 of its corresponding firewall 115. Using a user interface 230, a user 202 may cause the computing device 200 to initiate the method to retrieve configuration files (step 405). Alternatively, the computing device 200 may be configured to perform the method automatically, on a periodic basis, or in response to an automatically detected trigger. The computing device 200 may be connected via a network interface 225 to the computer network 100. The computing device 200 may query, which may be by pinging, nodes 105 on the computing network 100 to detect security appliances 110 operating firewalls 115. The computing device 200 may additionally or alternatively use a security scanner, as described above, to retrieve identification and configuration data from the nodes 105 in the network 110. In any event, the security appliances 110 may respond to such queries or other communications with a message including interpretive data identifying the firewall 115. For example, the message may include identifiers of a manufacturer and/or a type of the firewall 115. The computing device 200 may retrieve the identification by performing an access method based on the identifying information to determine the firewall type, for example by lookup in a database table stored in a memory or a storage device, such as a firewall access specifications data structure 240 in the database 205. In some embodiments, the access method may require authentication and/or encryption. By way of non-limiting example, in some embodiments the access method may require the use of SSL or Diffie-Hellman Key Exchange. The computing device 200 may request credentials from the user 202, who may enter them via the user interface 230. Alternatively, the credentials may be stored in a memory, which may include an encrypted memory, or a data storage, which may include an encrypted data storage, from which the computing device 200 fetches them, which may be the firewall access specifications data structure 240 in the database 205. The computing device 200 may then login to the firewall 115 using the credentials. If the login is successful and the computing device 200 is authenticated by the firewall 115, the computing device 200 may then determine commands for transmission to the firewall 115 to retrieve the firewall configuration 120. The computing device 200 may do this by lookup in a table stored in a memory or storage device based on the firewall type previously determined, which may be the firewall access specifications data structure 240 in the database 205. The computing device 200 may then transmit the commands to the firewall 115 and then receive from the firewall the firewall configuration file 120. The computing device 200 may then receive the retrieved firewall configurations 120 and store them in a memory or storage device, which may be in a retrieved configurations data structure 245 in the database 205.

As discussed above, the different firewall configurations 120 may be characterized by one or more different firewall configuration types. Thus, some of the firewall configurations 121 may be characterized by a first firewall configuration type, other ones of the firewall configurations 122 may be characterized by a second configuration type, and so on. For example, some firewall configurations 120 are encoded in a programming language, sometimes low-level and similar to assembly languages, and which may vendor-specific. Many such firewall configurations 120 are text-based. Examples include plaintext, XML, or other open source and proprietary languages, that use syntax operate commands similar to existing development languages. For example, ASA configurations are typically made in a text file with the file type suffix of .cfg, whereas files used to program and configure PaloAlto and Juniper appliances are formatted in XML with the filename suffix .xml. As a result these two vendor filetypes are not compatible. Furthermore, the different syntax found within each of the firewall configuration files complicates the process of comprehending the specification, as illustrated in Table I, which shows a side-by-side comparison of common commands (http://www.fortiadmin.com/2013/06/cli-fortigate-and-cisco.html).

TABLE I

| Fortigate | Cisco |
| --- | --- |
| show full-configuration | show run |
| execute factory-reset | write erase |
| show system interface | show run interface brief |
| diagnose hardware deviceinfo nic | show interface |
| get system status | show version |
| get system arp | diagnose ip arp list | show arp |
| get router info routing-table all | show ip route |
| diagnose system session list | show ip nat translation |
| diagnose system session clear | clear ip nat translation |
| get router info ospf neighbor | show ip ospf neighbor |
| get router info bgp neighbor | show ip bgp neighbor |
| get router info bgp summary | show ip bgp summary |

As discussed above, such typical characteristics of firewall configuration files greatly complicates the task of analysing individual firewall configuration commands, as well as the firewall configurations 120 of a number of firewalls 115 in a network 100, to determine their collective effect with respect to the accessibility of specific nodes 105.

Thus, the computing device 200 may be configured with a configuration standardization module 250 to receive and to process each one of the firewall configurations 120 to generate a corresponding standardized firewall configuration (step 410). In this way, a plurality of firewall configurations 120 characterized by different firewall configuration types may be processed, or translated, or reconfigured into a common, standardized firewall configuration type. For each one of the firewall configurations 120, the computing device 200 may be configured to determine the corresponding firewall configuration type. For each one of the different firewall configuration types, the computing device 200 may be configured with a corresponding algorithm. For each firewall configuration 120, having determined the firewall configuration type of the firewall configuration 120, the computing device 200 may be configured to process the firewall configuration parameters of the firewall configuration 120 based on the algorithm associated with the corresponding firewall configuration type. For example, the algorithm for each firewall configuration type may be specified in a firewall configuration processing specifications data structure 255 stored in the database 205. In this way, the computing device 200 may be configured to generate a corresponding standardized firewall configuration based on the received firewall configuration 120. And, by doing so in connection with a plurality of different firewall configurations 120 characterized by one or more different firewall configuration types, the computing device 200 may be configured to generate a respective plurality of standardized firewall configurations, which may be stored in a corresponding standardized configuration data structure 260 in the database 205.

In general, the computing device 200 may be configured to receive a firewall configuration file including any appropriate parameters, including for example segment specifications, critical path specifications, allowable protocols, blacklists, and whitelists. The computing device 200 may be configured with a configuration file parser which encodes or which accesses in a memory or storage device configuration file processing rules associated with the firewall configuration type of the configuration file. The computing device 200 may operate the configuration file parser to parse the firewall configuration file and generate any desired configuration parameters including, for example, specifications of interfaces of the firewall, network addresses, static routes, and network policies. In general, the firewall policies may be encoded in the firewall configuration file, and generated in the standardized firewall configuration file syntax, in terms of rules or sets of rules defined in terms of individual, sets, or ranges of internet protocol (IP) addresses, network ports, network protocols, and media access control (MAC) addresses or other appliance specific functions that are called for on that specific device/node/group, etc. as determined by policy. The computing device may be configured with further rules to modify, normalize, format, or otherwise render the parsed parameters into the standardized firewall configuration format. The computing device may then store the parsed and processed firewall configuration parameters in a memory or storage device, such as the database, as a standardized firewall configuration file in association with an identifier of the firewall.

One type of retrieved configuration file is a Cisco™ ASA configuration file which in form is a text file script specifying a set of commands. The firewall configuration file is received by the computing device. A user may define and input via a user interface of the computing device organization and/or physical location criteria for categorization. The computing device may remove whitespace from the file. Based on rules retrieved from a memory or a storage device, the computing device may then parse the configuration file to generate one or more of the following categories of firewall rule parameters: host name; interface; route; object network; object-group network; access group; and access-list. Each of these parameters is a category identifier that defines the firewall rule data format as a tuple. For example, a route, once identified by its category identifier, contains a destination IP, IP mask and default gateway inline with the category identifier. A non-limiting example of a Cisco™ ASA configuration file is shown below:

```
ConfigRouterRoute cRoute = new ConfigRouterRoute() ;
string[] split =
line.Substring(CATEGORY IDENTIFIER.Length) .Split (' ');
if (split.Length >= 4) {
   cRoute.DestIP = split[1];
   cRoute.DestIPMask = split[2];
   cRoute.DefaultGateway = split[3];
   result.Add(cRoute);
}
```

Each one of these categories of parameters may be parsed and processed to generate related standardized configuration parameters. For example, the host name may be saved in the standardized configuration. For each interface, the name, interface type, security level, and IP address may be parsed to generate standardized configuration interface parameters. For each route, the destination IP, destination gateway, and destination IP mask may be parsed to generate standardized configuration routes data. For each object network, the host and subnet parameters may be parsed to generate standardized object network parameters. For each object-group network, the host, object, and network parameters may be parsed to generate standardized configuration object group network parameters. The parsed access group data may be saved as like parameters of the standardized configuration file. For each access list, the object group, IP range, and access group may be parsed to generate the access list parameters of the standardized configuration file. In the event that configuration data for the firewall had been previously stored by a similar or different means, for example by a previous retrieval and generation process as described, or by a different means such as manual input, the computing device may be configured to retrieve the previous configuration file and compare it, which may be a 1:1 parameter-for-parameter comparison, to the standardized configuration file now generated, and log and output any differences for resolution.

Generally, a configuration file will have the same basic categories, but may differ in how a tuple is ordered or the elements within. For example, in the Fortinet™ configuration format, a route may contain the same IP destination, IP mask and default gateway, but may also include fields for Priority and Distance which must be parsed and used to determine the routing table preferences. Configuration files such as Fortinet™ may also include mark-up language such as HTML changing the parsing tasks. A non-limiting example of a Fortinet™ configuration file is shown below:

```
config router static
   edit 1
      set device "wan1"
      set distance 15
      set dst 10.10.12.0 255.255.252.0
      set gateway 193.69.108.161
```

The computing device 200 may be further configured with an enclave determination module 265 to identify and determine security enclaves 125 in the computer network 100 based at least in part on the standardized firewall configurations (step 415). For example, and as noted above, each enclave 125 may be regarded as a security VLAN, an Electronic Security Perimeter, or network segment, and the computing device 200 may identify each enclave 125 as constituting a group of nodes 105 which is characterized by an identical, or substantially similar, accessibility, inbound and/or outbound, to other nodes 105 in the network 100, and/or external to the network 100. Such determination may be made on the basis of the standardized firewall configurations, including, for example, the rule sets which define accessible IP address ranges, port ranges, protocols, and MAC addresses. The computing device 200 may be configured to store the identity and specifications of each enclave 125 in a memory or storage device, such as in an enclaves data structure 270 in the database 205.

The generation of standardized firewall configurations enables reliable contrast and comparison of the firewall configurations of different security appliances of different types. This further enables the identification of security enclaves as noted above. Without the processing of retrieved firewall configurations to generate standardized firewall configurations, as described above, the task of identifying security enclaves would be impossible, or at least prohibitively time-consuming and costly, and thus these steps solve a crucial problem in cybersecurity.

As discussed above, one or more of the nodes 105 in the computer network may be assigned a security sensitivity value. For example, the security sensitivity values may include Cisco™ ASA Security levels, which in the case of security appliances 110 may be assigned via the "nameif" command. The computing device 200, or a different computing device, may be configured to receive the security sensitivity values via a user interface 230, and may connect a storage device to store records associating each node 105, which may be by means of a node identifier, to the corresponding security sensitivity values. In this way, the computing device 200 may be used to receive and store in the storage device data associating each node 105 with a corresponding security sensitivity value (step 420), such as in a security sensitivity values data structure 275 in the database 205. In the event that for any particular node or nodes no security sensitivity values are assigned, the computing device 200 may be further configured to assign a default security sensitivity value to that node or nodes.

The computing device 200 may be further configured with a traffic monitoring module 280 configured to monitor the computer network 100 to identify and characterize network traffic flows between corresponding ones of the nodes 105, including the network appliances 110 (step 425). For example, the computing device 200 may be configured to detect traffic flows between any two nodes 105 in the network, and identify characteristics of the traffic flow. The traffic flow characteristics may include its network protocol, including for example transmission control protocol (TCP), user datagram protocol (UDP), or file transfer protocol (FTP), among others. The characteristics may also include the internet protocol port of either or both of the source and/or destination of the traffic flow. Further characteristics are possible.

The computing device 200 may be configured with any suitable means to monitor the traffic flows. For example, the traffic monitoring module 280, which may include interfaces, may be configured with a packet capture module (PCAP) output which may use a switched port analyzer (SPAN) port interface, which may include for example the libpcap library in Unix-based systems or the WinPcap library in Windows-based systems, and by operation thereof capture network traffic data from the computer network. The network traffic data may include, for example, an organizationally unique identifier (OUI), a media access control (MAC) address, a port number source and destination, and a protocol, associated with the network traffic, Internet Protocol address source and destination, Time To Live (TTL) counter, packet length, priority and payload.

In addition, the computing device 200 may also be configured with a vulnerability scanner (not shown), which may include for example a Nessus™ vulnerability scanner produced by Tenable Network Security of Columbia, Maryland, United States of America. The vulnerability scanner may collect from the computer network vulnerability information, CVE data, and vulnerability descriptions.

The network traffic data, and optionally also the vulnerability data, collected by such means may be stored by the computing device 200 in a memory or storage device, such as a traffic data structure 285 in the database 205, for later access. This stored aggregate information provides the computing device 200 the ability to identify and quantify the nodes 105 within a specific enclave 125.

By the above methods, the computing device 200 may therefore monitor data traffic in the network 100 and generate and store data representing and characterizing the data traffic.

Thus, as described above, the computing device 200 may be configured to generate and store standardized firewall configurations corresponding to the network appliances 110 operating firewalls 115, to identify and characterize network enclaves 125, to receive and store security sensitivity values of the nodes 105, and to monitor, generate, and store data representing and characterizing data traffic in the computer network 100. The computing device 200 may be configured to store some or all of this information in a data storage as a representation of the security configuration of the computer network 100, such as in a network security configuration data structure 290 in the database 205.

The computing device 200 may be further configured with a map generation module 295 to generate in a display 210 a visual representation of the security configuration of the computer network 100 (step 430). For example, the computing device 200 may be configured to generate a map as follows.

Figure 4:
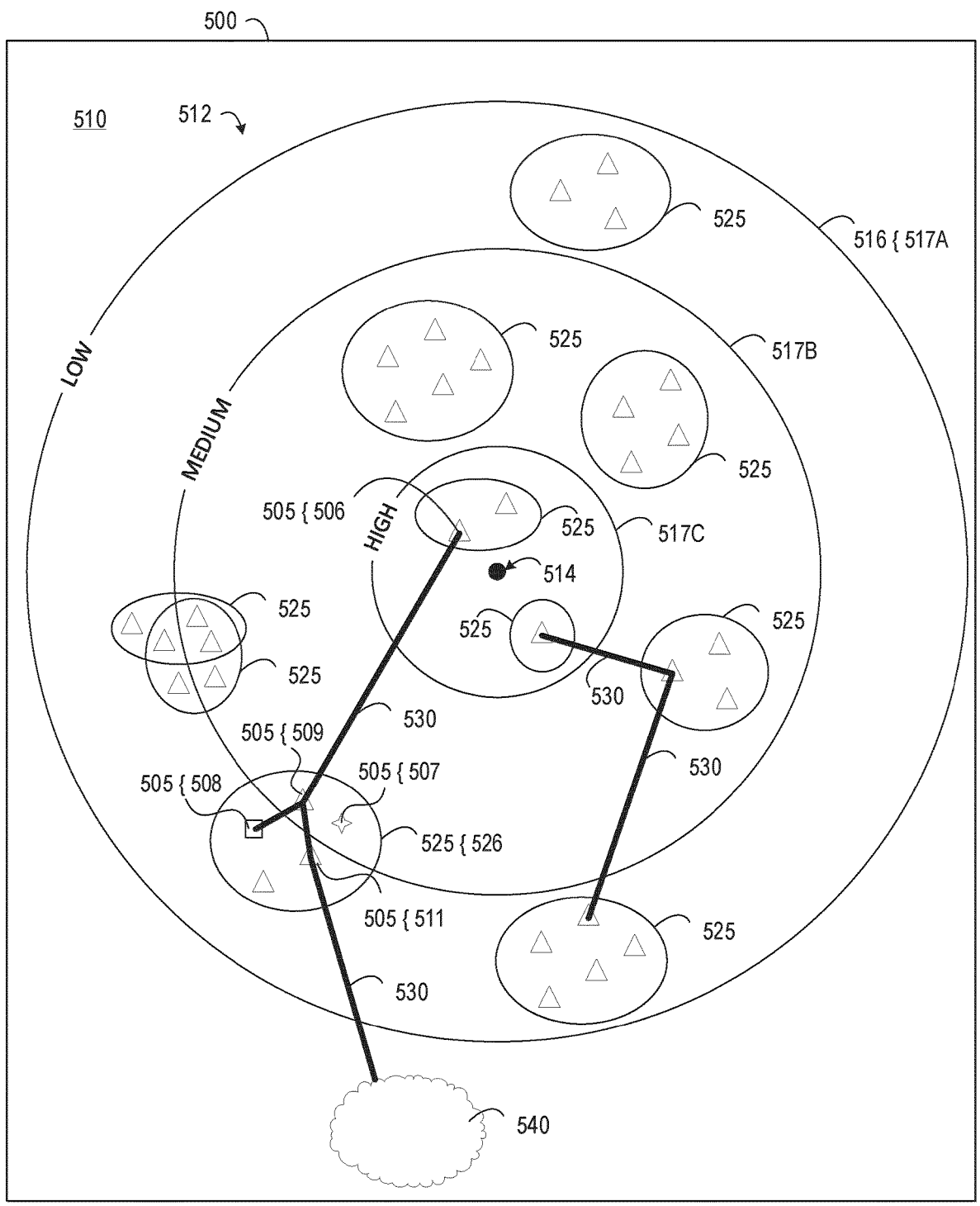
FIG. 4 is a schematic diagram of a map for display by the computing device representing a security configuration of the computer network.
Figure 5:
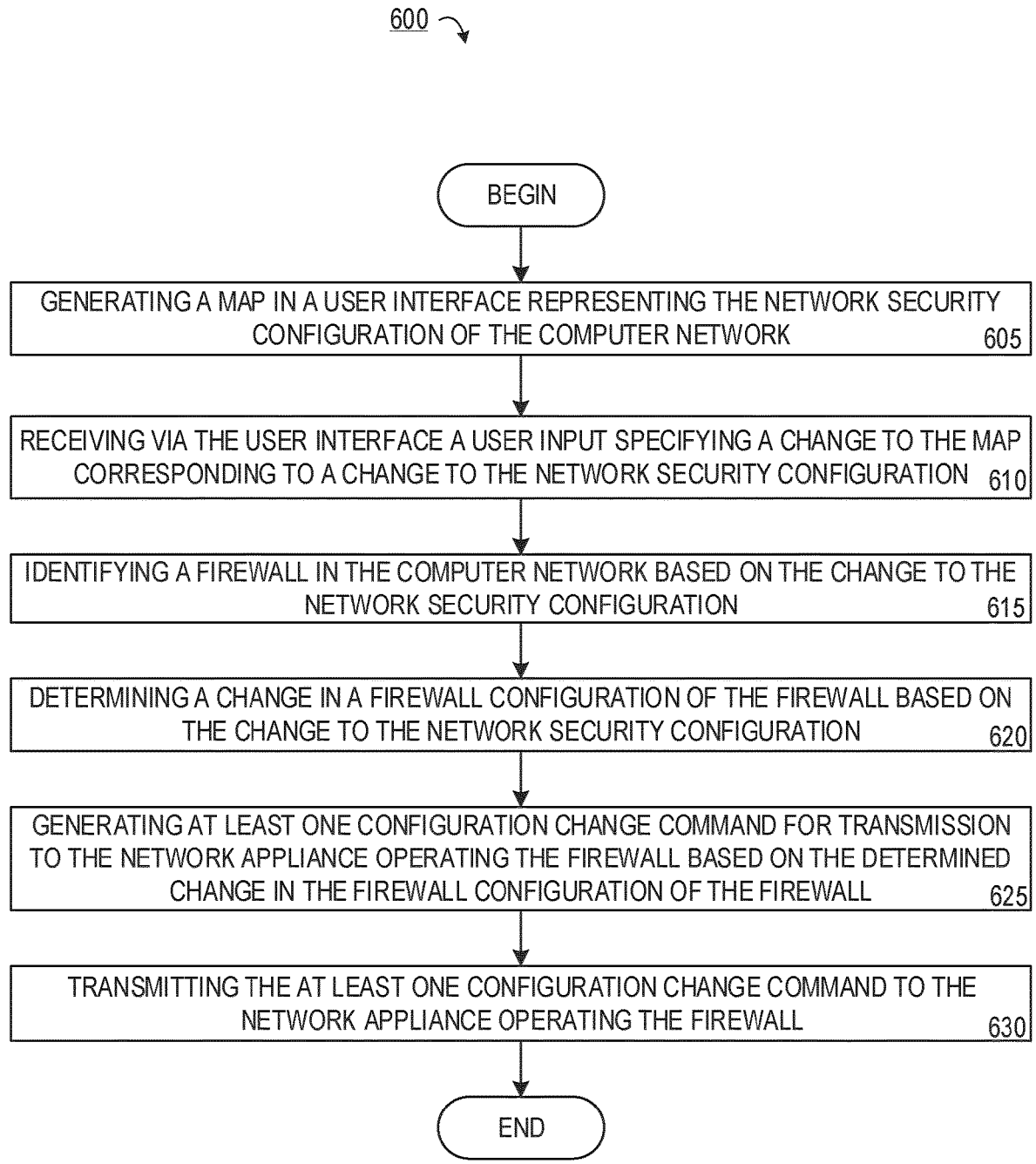
FIG. 5 is a flowchart of a method for modifying a network security configuration of a computer network.

With reference to FIG. 4, the map 500 may include an icon 505 (only sample ones of which are identified in order to avoid obscuring the drawing) representing each node 105, including each network appliance. A visual characteristic of the icon 505, such as its shape, may represent a type of the node 105 represented, or any other relevant selected characteristic of the node 105. For example, a first icon 506 having a first shape, such as a triangle, may signify a node 105 having a first characteristic, while a second icon 507 having a second shape, such as a star, or a third icon 508 having a third shape, such as a square, may respectively signify nodes 105 having second and third different characteristics. In each case, the icon 505 may be positioned in the map 500 based on the security sensitivity value of the corresponding node 105. For example, the map may include a background 510 including a region 512 having a center 514 and an outer perimeter 516. In particular, the map 500 may include a background 510 having a series of concentric perimeters 517A, 517B, 517C, such as circles, which may be similar to the arrangement of a shooting target. The placement of each icon 505 relative to the center 514 and the outer perimeter 516 of the region 512 in the background 510 may be based on the corresponding security sensitivity value. For example, icons 505 of nodes 105 having relatively higher (more sensitive, more restricted) security sensitivity values may be positioned closer to the center 514 of the region 512 relative to icons 505 of nodes 105 having relatively lower security sensitivity values. The concentric perimeters 517A, 5176, 517C may signify and illustrate different ranges of security sensitivity values. For example, icons 505 contained within a first perimeter 517A but outside of a second perimeter 5176 may signify nodes 105 having relatively low security sensitivity values, icons 505 contained within the second perimeter 5176 but outside of a third perimeter 517C may signify nodes 105 having relatively medium security sensitivity values, and icons 505 contained within the third perimeter 517C may signify nodes 105 having relatively high security sensitivity values. In other words, the icons 505 of nodes 105 having higher security sensitivity values may be closer to the 'bull's-eye' of a concentric, shooting-target background 510, readily illustrating in visual form the respective security sensitivity values of the nodes 105 in the computer network 100. Other arrangements are possible. The use of the concentric ring view provides the user with the ability to visualize key characteristics about a given node, group, or network within the context of the security risk posture. This also is translated into a 'depth' or layered view that can be created by illustrating the outermost layer as the bottom of such a view and the center as the 'top'. Furthermore, the layouts can also be used in an organic creation mode, where the visualizations are created using a "Force-Directed" graph representation and allows the user to create and map the organic nature of the networks without the model adhering to a specific model.

In addition, the map 500 may position the icons 505 corresponding to the nodes 105 in the computer network 100 in order to illustrate network enclaves 125, and may further include graphical representations of walls, or boundaries 525, illustrating those nodes 105 contained within each network enclave 125. For example, the map 500 may be generated such that the icons 505 corresponding to nodes 105 belonging respectively to one or more corresponding network enclaves 125 may be positioned close together, or in other words grouped together, relative to the icons 505 of other nodes 105. In addition, for one or more of the network enclaves 125, the map may be generated to include a visual boundary 525 enclosing the icons 505 of the nodes 105 belonging to the network enclave 125.

In addition, the map 500 may be generated to show one or more of the network traffic flows between corresponding first and second nodes 105 in the network 100, or external to the network 100. For example, for each of one or more of the network traffic flows, the map 500 may include a line 530 joining the icons 505 corresponding to the nodes 105 participating in the traffic flow. The line 530 may have visual characteristics which indicate aspects of the of the network traffic flow. For example, for one of more of the traffic flows, the corresponding line 530 may have a colour indicative of a network protocol of the network traffic flow. Different colours may represent different network protocols. In this way, the map 500 may readily illustrate in visual form network traffic flows as well as the protocols or other aspects of the network traffic flows.

The map 500 may illustrate, at any given time, more than one, or all, of the network traffic flows, in the manner described. Alternatively, the user interface may be interactive and selectively illustrate one or more of the network traffic flows responsive to selections made by a user 202 using the user interface 230. For example, display 210 may be configured to illustrate a particular network traffic flow as described, for example by rendering a coloured lined, when the user 202 selects an icon 505 representing one of the nodes 105 involved in the network traffic flow. Such selection may be performed by any suitable means, and may include using a pointing device of the user interface 230 to move a cursor on, above, or about the icon 505 and wait a pre-determined period—in other words, 'hover' over the icon 505. Alternatively, selection may including using the point device to 'click' on the icon 505. Alternatives are possible.

The generation of a map 500 as described above which graphically represents the security configuration of the computer network 100, including the security sensitivities of the nodes 105, network enclaves 125, and network traffic, enables a user 202, such as a network security administrator, conveniently and readily to assess the overall security configuration of the computer network 100, and additionally to detect defects inconsistent with the security policy. For example, the map 500 as described enables such a user 202 quickly to identify a traffic flow between two nodes 105 with different security sensitivity values, or in different enclaves 125, or otherwise intended not to be capable of accessing each other, but through an unintended combination of the security configurations 120 of different security appliances 110 access is nevertheless technically possible. For example, despite diligent effort, it may be possible for a first node 105, represented by icon 508, characterized by a low security sensitivity to access a second node, represented by icon 506, characterized by a high security sensitivity, contrary to the security policy, by way of access to a third node, represented by icon 509, characterized by a medium security sensitivity which is in the same enclave, represented by boundary 526, as the first node. In a similar way, the map 500 may show that access to the node 105 represented by icon 506 is even possible from an external network 300, such as the Internet, represented by an external network icon 540, via yet another intermediate node 105 represented by icon 511, and the node 105 represented by icon 509 as indicated above. As discussed above, such a result can and often follows from the complexity of firewall configurations, and the computational difficulty of inferring unintended security consequences from the overlapping influences of multiple firewall configurations. The presently disclosed solution, however, sidesteps such difficulties, and instead of attempting to automate completely the task of detecting configuration defects, it instead generates a visual representation of the network security configuration which renders such defects immediately apparent to the eye of a network security administrator of ordinary skill.

The computing device 200 may also be configured to modify the network security configuration of the computer network 100 comprising the plurality of network appliances 110 based on the generated map 500 in the display 210. A corresponding method 600 is shown in FIG. 6. The computing device 200 generates the map 500 in the display 210 of the user interface 230, which may be by the method 400 described above. The computing device 200 may be configured to receive via the user interface 230 displaying the configuration map 500 using display 210 a user input specifying a change to the map 500 corresponding to a change in the network security configuration (step 610). For example, the computing device 200, and in particular the map generation module 295, may be further configured with or interface a configuration modification module 297 (shown in FIG. 2) to receive, via the user interface 230, inputs which modify displayed elements of the map 500, and based on the modifications determine the particular changes to one or more of the firewall configurations 120 of the security appliances 110 corresponding to the modification.

For example, the computing device 200 may be configured to enable a user 202 to use the user interface 230 to select and move, e.g. drag-and-drop, in the map 500 an icon 505 representing a node 105 from a first location in the map 500 within a visual boundary 525 corresponding to an enclave 125, e.g. a first enclave 126 to a second location in the map 500 outside of the visual boundary 525 of the first enclave 126. The configuration modification module 297 may be configured to determine which firewalls 115 are implicated by the modification (step 615), for example by lookup in the enclaves data structure 270 or the network security configuration data structure 290 to identify one or more firewalls 115 associated with the first enclave 126. The configuration modification module 297 may be further configured to determine the changes in the firewall configurations 120 of those identified firewalls 115 required to correspond to the modification (step 620), for example to delete or modify one or more firewall configuration parameters of the firewall configurations 120 of the identified firewalls 115 so as no longer to limit traffic to or from the node 105.

The configuration modification module 297 may be further configured to implement the changes by formulating the command sets appropriate to each corresponding firewall 115 (step 625) and transmitting the command sets to the corresponding security devices 110 with authentication and encryption as required (step 630). For example, for a particular firewall 115 for which the firewall configuration 120 is to be changed responsive to the above-described user input, the intended firewall configuration changes may initially be determined and formulated relative to the standardized firewall configuration of the firewall 115, which may be retrieved from the standardized configuration data structure 260 based on the determined identifier of the firewall 115. The configuration modification module 297 may be further configured to determine a firewall configuration type of the firewall configuration 120 of the firewall 115, which may be by lookup in a data structure in the database 205 which stores an association between an identifier of the firewall 115 and a firewall configuration type, and which may include one or more of the firewall access specifications data structure 240, the retrieved configurations data structure 245, or the network security configuration data structure 290. Having determined the type of the firewall configuration 120, the configuration modification module 297 may be further configured to generate one or more configuration change commands based on the intended firewall configuration changes for the firewall configuration 120 of the firewall 115 and the firewall configuration type of the firewall 115. The computing device 200 may be configured with a corresponding algorithm associated with the firewall configuration type of the firewall configuration 120 operable to generate the one or more configuration change commands based on the intended firewall configuration changes formulated relative to the standardized firewall configuration. A corresponding algorithm for each firewall configuration type may be specified in a data structure in the database 205, which may include the firewall configuration processing specifications data structure 255 stored in the database 205.

Having generated for each firewall 115 identified as implicated by the desired network security configuration change corresponding configuration change commands relative to the firewall configuration type of the firewall configuration 120 of the firewall 115, the computing device 200 may be further configured to transmit the respective configuration change commands to the corresponding firewalls 115 using the network interface 225 based on an access method which may be specified in the database 205, which may include in the firewall access specifications data structure 240 stored in the database 205. The computing device 200 may request credentials from the user 202, who may enter them via the user interface 230. Alternatively, the credentials may be stored in a memory, which may include an encrypted memory, or a data storage, which may include an encrypted data storage, from which the computing device 200 fetches them, which may be the firewall access specifications data structure 240 in the database 205. The computing device 200 may then login to the firewall 115 using the credentials, and transmit the configuration change commands to the firewall 115.

In the above example, the user input specifying the desired change to the network security configuration involved removal of a node 105 from a first enclave 126. The configuration modification module 297 may be further configured to determine and implement network security configuration changes involving the addition or inclusion of a node 105 in an enclave 125, e.g. a second enclave 127, responsive to user input selecting and moving in the map 500 an icon 505 representing the node 105 from a first location in the map 500 outside of, to a second location inside, a visual boundary 525 corresponding to the second enclave 127. Such configuration is substantially the same as the configuration described above, including in that the configuration modification module 297 is configured to determine the changes in the firewall configurations 120 of those identified firewalls 115 required to correspond to the modification, except that such changes, and the resulting generated configuration change commands, add or modify one or more firewall configuration parameters of the firewall configurations 120 of the identified firewalls 115 so as to limit traffic to or from the node 105. The configuration modification module 297 may be configured to perform both kinds of changes, and yet other changes or combinations thereof based on the principles described above.

Having modified the firewall configurations 120 of the implicated firewalls 115, as described above, the traffic routing configurations, e.g. routing tables, of affected upstream and/or downstream traffic routing appliances may be automatically modified in order to route traffic for the node 105 consistently with the modified network security configuration. For example, where the node 105 is added or included in the second enclave 127, one or more upstream and/or downstream traffic routing appliances may be automatically modified in order to route traffic to/from node 105 through the security appliance 110 operating firewall 117 such that firewall 117 is operable to limit traffic to/from the node 105. Similarly, where the node 105 is removed from the first enclave 126, one or more upstream and/or downstream traffic routing appliances may be automatically modified so as no longer to require routing of traffic to/from node 105 through the security appliance 110 operating firewall 116. Updating of the traffic routing configurations of the upstream and/or downstream traffic routing appliances may be performed in any appropriate way, including by means of known communications protocols including, but not limited to, IGRP (Internet Gateway Routing Protocol and BGP (Border Gateway Protocol).

The computing device 200 may be further configured with a dynamic accessibility diagram generation module 299 to generate in a display 210 a visual representation of accessibility of a selected node or nodes, or a group of nodes, such as a subnet, in the computer network 100. In particular, the method 700 of generating the dynamic accessibility diagram may be identical to the method 400 of generating the map 500, as described above, except instead of, or in addition to, the step of generating in the display 210 the visual representation of the security configuration of the computer network 100 (step 430), the method 700, shown in FIG. 6, may be configured to generate the dynamic accessibility diagram 800 (step 710), shown in FIG. 7, based on one or more of the enclaves data structure 270, security sensitivity values data structure 275, traffic data structure 285, and the network security configuration data structure 290 in the database 205, as follows. Moreover, when the generation of the dynamic accessibility diagram 800 (step 710) does not require any security sensitivity values described above, then step 420 involving receiving and storing in the storage device data associating each node 105 with a corresponding security sensitivity value may be optional.

Figure 7:
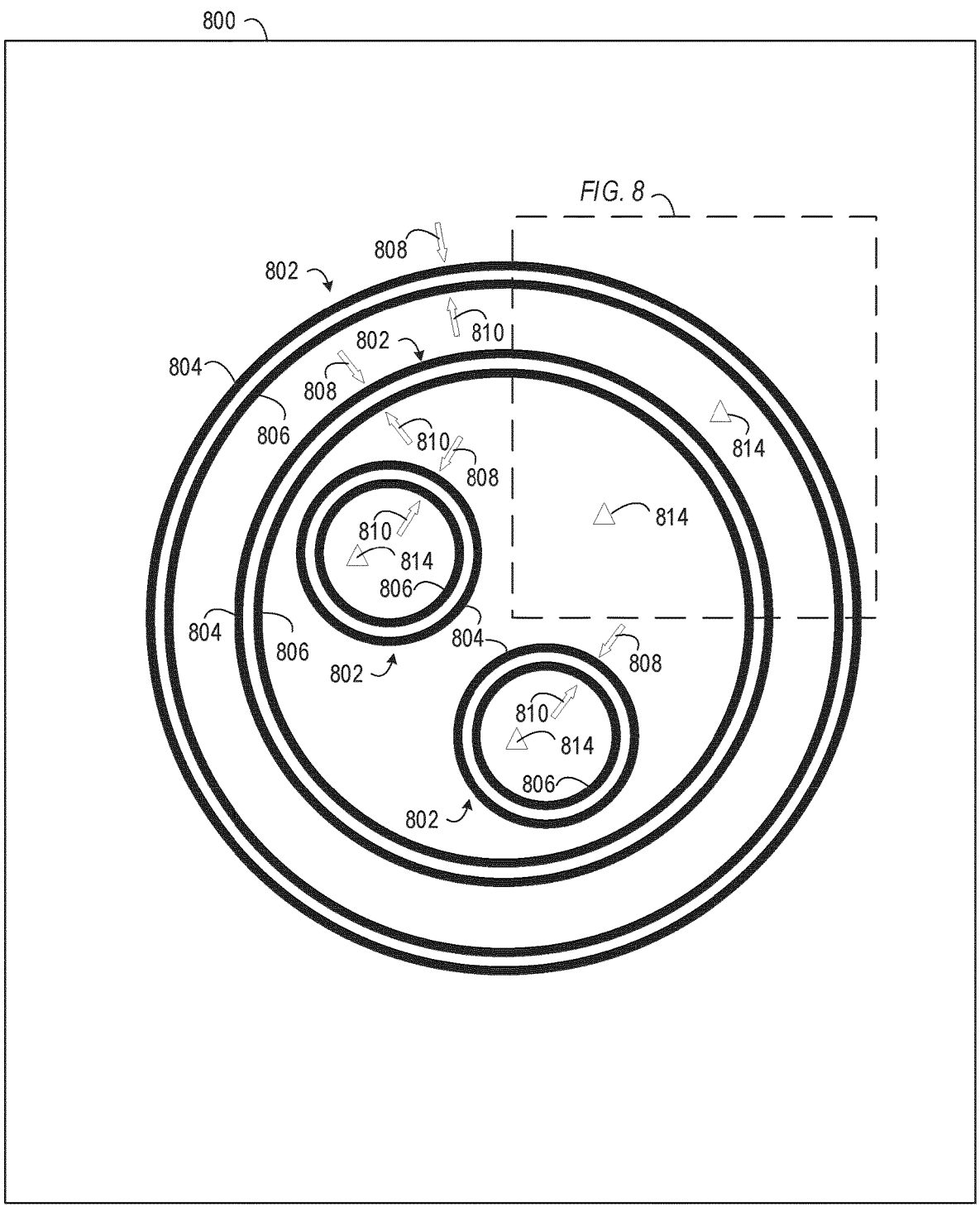
FIG. 7 is a schematic diagram of a dynamic accessibility diagram for display by the computing device representing a security configuration of the computer network.

With reference to FIG. 7, the diagram 800 may include for each of at least one corresponding firewall 115 a pair of concentric rings 802. The pair of concentric rings 802 for a given firewall 115 may have a similar conceptual significance as the boundary 525 in map 500 which graphically represents a network enclave 125 defined by a particular firewall 115 which commonly governs communication of nodes 105 within the enclave 125 with nodes 105 outside of the enclave 125. In other words, the pair of concentric rings 802 for a given firewall 115 may be an elaboration of the boundary 525 for a given enclave 125. As was the case in map 500, when the network 100 has nested security enclaves 125, each may be represented by a corresponding pair of concentric rings 802, as particularly shown in FIG. 7. Moreover, the diagram 800 may include icons 814 representing nodes 105, in a substantially similar manner as the icons 505 in the map 500, wherein the positioning of an icon 814 within a particular pair of concentric rings 802 likewise signifies that the corresponding node 105 is behind the firewall 115 corresponding to the concentric rings 802, again similarly to the respective placement of the icons 505 in the map 500 relative to the boundaries 525 representing enclaves 125.

As described in detail below, the pair of concentric rings 802 visually represents at least one access control list (ACL) defined by the firewall configuration 120 of the firewall 115. As is known in the art, a firewall ACL may include one or more ACL rules 905. A non-limiting example of an ACL rule 906 is shown in FIG. 10. The ACL rule specifies one or more remote node parameters 907, one or more local node parameters 909, and a rule 911 specifying in which direction or directions traffic is permitted, if any. In this context, a node is remote when it is outside of the security enclave defined by the firewall configuration, a node is local when it is inside the security enclave, traffic is inbound when it flows from a remote node to a local node, and traffic is outbound when it flows from a local node to a remote node. Thus, the ACL rule may define one or more remote addresses (and ports), one or more local addresses (and ports), and specify that traffic is permitted inbound only (i.e. outbound traffic is blocked), outbound only (i.e. inbound traffic is blocked), both (i.e. neither inbound nor outbound traffic is blocked), or neither (i.e. both inbound and outbound traffic are blocked). Depending on the firewall configuration type, ACL rules for a particular firewall may instead define source and destination addresses, as opposed to local and remote addresses. Such source or destination addresses may be either remote or local to a given enclave, and the identification of a given address as source or destination may implicitly specify a traffic direction. In any event, ACL rules so defined may be resolved into remote and local addresses, and permitted traffic directions as shown and described, and this may be a function of the configuration standardization module 250 when generating the standardized firewall configurations in the standardized configuration data structure 260 in step 410.

Figure 8:
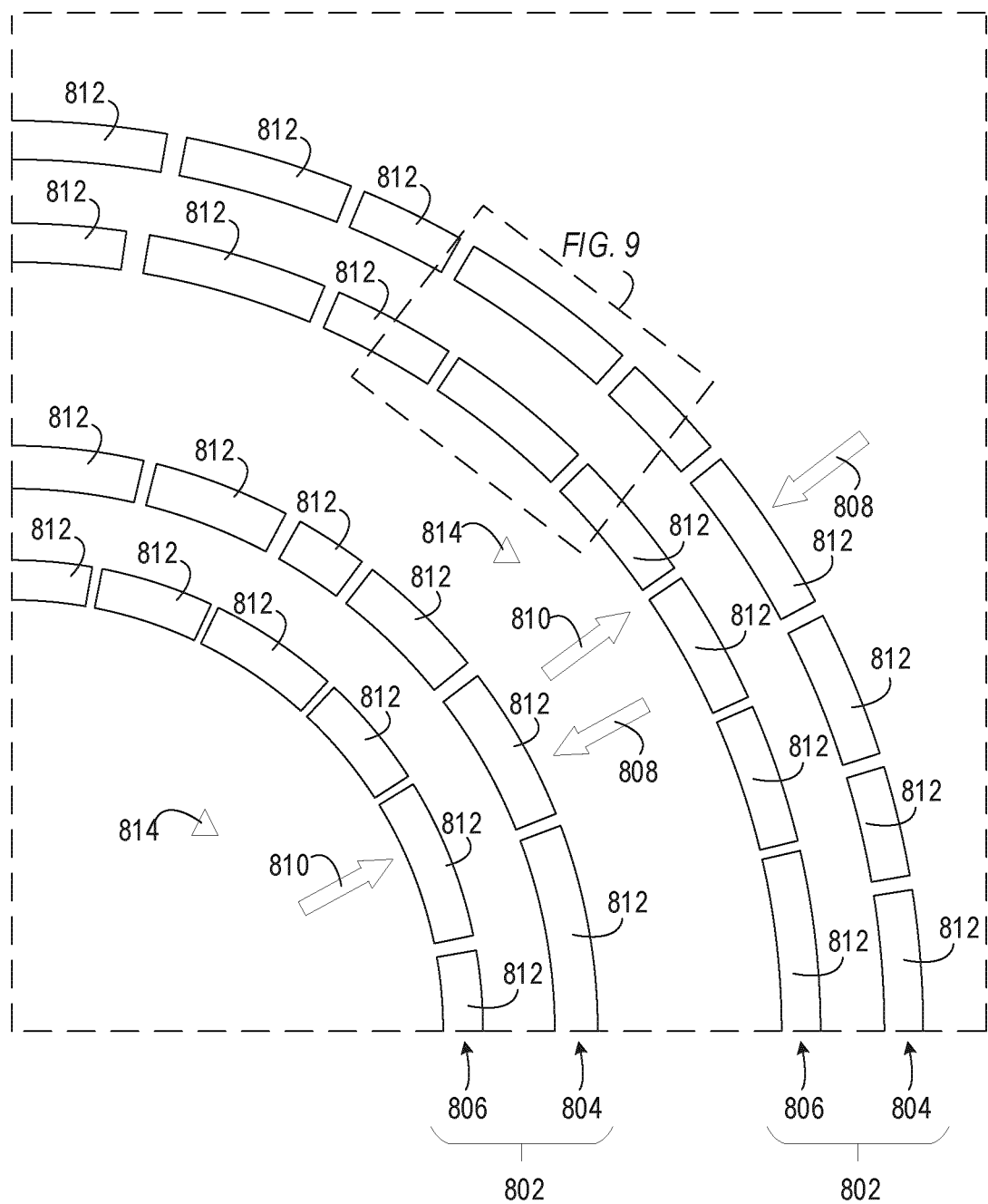
FIG. 8 is an expanded view of a portion of the dynamic accessibility diagram of FIG. 7 particularly illustrating access control list (ACL) parameter segments of inner and outer concentric rings of the dynamic accessibility diagram.

In particular, as shown in FIGS. 7 & 8, each pair of concentric rings 802 may include an outer ring 804 and a concentric inner ring 806, wherein the outer ring 804 illustrates the remote node parameters defined in one or more ACL rules, and the inner ring 806 illustrates the local node parameters defined in one or more ACL rules. As shown in FIG. 8, each ring may be formed of one or more ACL parameter segments 812, each corresponding to parameters which may include an address or range of addresses defined in one or more ACL rules of the firewall configuration 120 of the firewall 115. The ACL parameter segments 812 in the outer ring 804 represent remote nodes, and the ACL parameter segments 812 in the inner ring 806 represent local nodes, defined in one or more of the firewall ACL rules. Since any particular parameters, such as address or range of addresses, may be defined in more than one ACL rule, a given ACL parameter segment 812 may or may not correspond uniquely to any particular ACL rule, but may instead correspond to all ACL rules which define those parameters, such as address or range of addresses. A user of the system 100 may thus understand from the visualization of the firewall 115 as the pair of concentric rings 802 with ACL parameter segments 812 as described that the corresponding firewall configuration 120 contains at least one ACL rule which defines particular parameters, such as a particular address or address range, associated with the corresponding ACL parameter segment 812.

To reiterate, each ACL parameter segment 812 signifies that the parameters, e.g. address range, associated with that ACL parameter segment 812 are defined in at least one ACL rule of the firewall configuration 120 of the firewall 115, that the outer ring 804 ACL parameter segments 812 represent ACL parameters relating to remote nodes outside of the firewall 115, and the inner ring 806 ACL parameter segments 812 represent ACL parameters relating to local nodes inside of the firewall 115. With respect to inbound traffic (arrow 808) into the corresponding enclave 125, each outer ring 804 ACL parameter segment 812 represents an ACL parameter relating to the inbound traffic source being one or more remote nodes outside of the firewall 115, and each inner ring 806 ACL parameter segment 812 represents an ACL parameter relating to the inbound traffic destination being one or more local nodes inside of the firewall 115. Conversely, with respect to outbound traffic (arrow 810) out of the corresponding enclave 125, each inner ring 806 ACL parameter segment 812 represents an ACL parameter relating to the outbound traffic source being one or more local nodes inside of the firewall 115, and each outer ring 804 ACL parameter segment 812 represents an ACL parameter relating to the outbound traffic destination being one or more remote nodes outside of the firewall 115. (Arrows 808, 810 are shown for present explanation only, and may not be visible in the diagram 800 as generated by the computing device 200 and displayed on the display 210.) Thus, each ACL rule having parameters identifying local nodes inside of the enclave 125, and also parameters identifying remote nodes outside of the enclave 125, may be represented by a combination of the respective ACL parameter segments 812 of the outer ring 804 and inner ring 806. A given ACL parameter segment 812 may represent an ACL parameter for either the traffic source or the destination depending on whether the traffic of interest is inbound traffic or outbound traffic.

Figure 9:
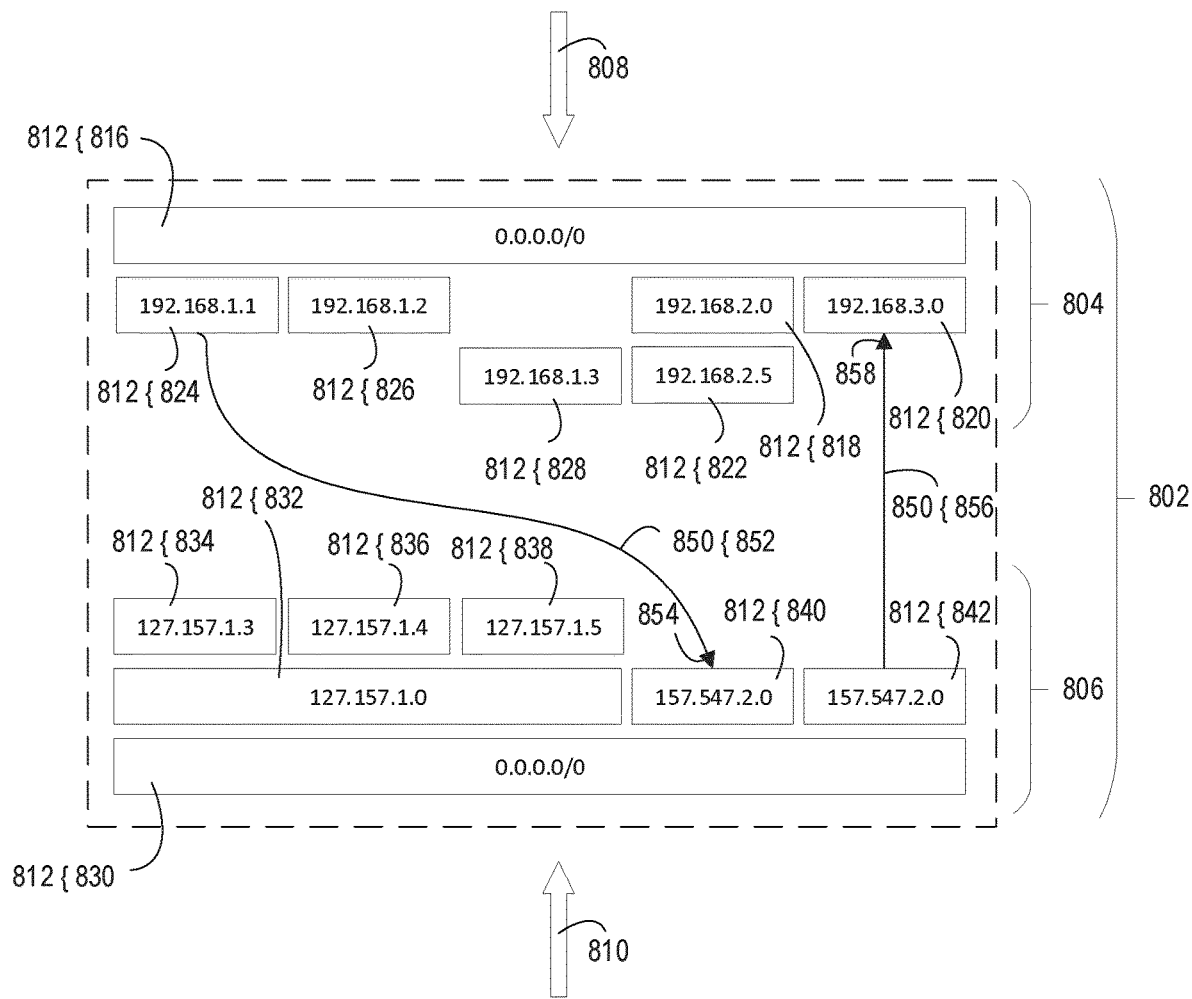
FIG. 9 is an expanded view of a portion of the portion of the dynamic accessibility diagram of FIG. 8 particularly illustrating details of the ACL parameter segments of the inner and outer concentric rings of the dynamic accessibility diagram.

Thus, FIG. 9 shows, by way of example only, a particular portion of an exemplary pair of concentric rings 802, in order to illustrate figuratively the ACL parameter segments 812 and their respective arrangement. (For the sake of clarity, the illustrated portion of the concentric rings 802 is not curved, though it may appear curved in the diagram 800 as generated by the computing device 200 and displayed on the display 210.) As shown, the illustrated portions of the outer ring 804 and inner ring 806 may each include a number of ACL parameter segments 812 each representing a parameter of one or more related ACLs, wherein the ACL parameter segments 812 in the outer ring 804 portion represent ACL parameters related to nodes outside of the firewall 115, and the ACL parameter segments 812 in the inner ring 806 portion represent corresponding ACL parameters related to nodes inside of the firewall 115, relative to the enclave 125 represented by the concentric rings 802.

Thus, for example, the outer ring 804 may be have ACL parameter segment 816 which represents an ACL parameter applicable to all nodes, e.g. addresses and ports, i.e. 0.0.0.0/0 outside of the firewall 115. (While TCP/IP addresses are used in these examples, the principles disclosed herein are not limited to such examples, and may be applicable to other computing network protocols and methods, such as UDP or ICMP.) Thus, this ACL parameter segment 816 may represent an ACL parameter of one or more ACL rules of the firewall configuration 120 which defines remote nodes 0.0.0.0/0 (i.e. as a source of inbound traffic 808, or as a destination of outbound traffic 810, or both).

Each of the outer ring 804 and inner ring 806 may have nested rings each illustrating more specific ACL parameters. Thus, for example, ACL parameter segments 818, 820 may be positioned below the 0.0.0.0/0 ACL parameter segment 816, each respectively representing ACL parameters defining remote subnets 192.168.2.0 and 192.168.3.0. Moreover, even more specific ACL parameter for specific remote address 192.168.2.5 may be represented by ACL parameter segment 822 positioned below the ACL parameter segment 818 representing the ACL parameter 818 for 192.168.2.0. In this way, a hierarchical relationship between the respective ACL parameters for remote addresses 0.0.0.0/0, 192.168.2.0, and 192.168.2.5 may be represented graphically by corresponding ACL parameter segments 816, 818, 822. When the firewall configuration 120 has no ACL rule for a particular remote subnet, but has one for a specific remote address, then the corresponding ACL parameter segment 812 may be rendered radially adjacent the next-most general ACL parameter segment 812. Thus, as shown in FIG. 9, if there is no ACL rule for remote subnet 192.168.1.0, but there are ACL rules defining remote addresses 192.168.1.1 and 192.168.1.2, these may be represented as corresponding ACL parameter segments 824, 826 positioned radially adjacent the ACL parameter segment 816 representing the ACL rule for remote addresses 0.0.0.0/0. Alternatively, ACL parameter segments 812 may be radially positioned according to rank even if this results in radial gaps. Thus, as an alternative, if there is an ACL rule defining remote address 192.168.1.3, but no ACL rule defining subnet 192.168.1.0, then the ACL parameters for remote address 192.168.1.3 may be represented by ACL parameter segment 828 which is spaced radially from the ACL parameter segment 816 representing the ACL parameters for remote 0.0.0.0/0, so that ACL parameter segment 828 is radially aligned with ACL parameter segment 822, which likewise represents the ACL parameter for a specific remote address, namely 192.168.2.5, as described above. Similarly, the inner ring 806 may have ACL parameter segments 812 in substantially the same fashion as described above, but instead representing the local nodes defined in ACL rules of the firewall configuration 120. Thus, in this non-limiting example, inner ring 806 has ACL parameter segment 830 representing definition in at least one ACL rule of the firewall configuration 120 of all local addresses, i.e. 0.0.0.0/0, ACL parameter segments 832, 840 representing the definition in one or more ACL rules of local subnets 127.157.1.0 and 157.547.2.0, respectively, and ACL parameter segments 834, 836, 838 representing in one or more ACL rules specific local addresses 127.157.1.3, 127.157.1.4, and 127.157.1.5. Optionally, more than one ACL parameter segment 812 may be generated to represent a given address or address range. For example, as shown, a second ACL parameter segment 842 also represents local subnet 157.547.2.0. Advantages of this option are described below.

To reiterate, each ACL parameter segment 812 signifies that the parameters, e.g. address or address range, associated with that ACL parameter segment 812 are defined in at least one ACL rule of the firewall configuration 120 of the firewall 115, that the outer ring 804 ACL parameter segments 812 represent ACL parameters relating to remote nodes outside of the firewall 115, and the inner ring 806 ACL parameter segments 812 represent ACL parameters relating to local nodes inside of the firewall 115. It will now be described how the computing device 200 is configured to enable a user 202 to operate the dynamic accessibility diagram 800 using the display 210 and the user interface 230 to quickly and easily graphically display the ACL rules of the firewall configurations 120 of the firewalls 115 of the computer network 100, and their combined effect which permit or restrict accessibility to the nodes 105 in the computer network 100.

The computing device 200 including the dynamic accessibility diagram generation module 299 may be operable, using the display 210 and user interface 230, to receive from the user 202 a selection of one or more of the ACL parameter segments 812 graphically rendered in the dynamic accessibility diagram 800. Any suitable selection method is possible. For example, a user may select a particular ACL parameter segment 812 by using the user interface 230 to move a pointer to or within the ACL parameter segment 812 and 'clicking' it or 'hovering' over it, i.e. leaving the pointer within the bounds of the ACL parameter segment 812 for a preconfigured period of time. Alternatives known in the art are possible.

When a first ACL parameter segment 812 is so selected, the computing device 200 may be configured to render in the dynamic accessibility diagram 800 a graphical illustration of a relationship between the selected ACL parameter segment 812 and at least one other, second ACL parameter segment 812, when the first ACL parameter segment and the second ACL parameter segment are defined in a particular ACL rule. In particular, the graphical illustration may show that the firewall configuration 120 contains an ACL rule which affects the accessibility between the nodes corresponding to the first ACL parameter segment and the nodes corresponding to the second ACL parameter segment. Even more particularly, the graphical illustration may include an accessibility curve connecting the first and second ACL parameter segments, and the accessibility curve may be an arrow which illustrates a traffic flow direction. Moreover, the accessibility curve may be rendered so as to illustrate graphically whether accessibility is permitted or blocked.

Thus, by way of non-limited example, and with reference again to FIG. 9, when the ACL parameter segment 824 corresponding to the ACL parameter related to remote address 192.168.1.1 is selected, the computing device 200 may dynamically render one or more accessibility curves 850, including particularly accessibility curve 852, which illustrates graphically that remote address 192.168.1.1 corresponding to ACL parameter segment 824, and local subnet 157.547.2.0 corresponding to ACL parameter segment 840, are commonly defined in an ACL rule 913 of the firewall configuration 120 illustrated in FIG. 11. Moreover, as shown, the accessibility curve 852 may be rendered as an accessibility arrow, with the arrowhead 854 ending at ACL parameter segment 840, illustrating that the corresponding ACL rule relates to traffic from remote address 192.168.1.1 to local subnet 157.547.2.0, i.e. to inbound traffic 808. The accessibility curve 852 may be further graphically rendered so as to illustrate when such traffic is permitted or blocked. For example, the accessibility curve 852 may be rendered in a first colour, e.g. green, if traffic is permitted, and may be rendered in a second, different, colour, e.g. red, if traffic is blocked. Selection of the other ACL parameter segment, namely ACL parameter segment 840, may cause the computing device 200 to render the same, or a substantially similar, accessibility curve 852, except with the arrowhead ending at ACL parameter segment 824, indicating that the corresponding ACL rules relates to traffic from local subnet 157.547.2.0 to remote address 192.168.1.1, i.e. to outbound traffic 810. Moreover, in such case the accessibility curve 852 may be rendered in a different colour, as it is possible for inbound traffic 808 from remote address 192.168.1.1 to local subnet 157.547.2.0 be allowed, while outbound traffic 810 from local subnet 157.547.2.0 to remote address 192.168.1.1 is blocked, or vice versa. Further alternatively, when either ACL parameter segment 824, 840 is selected, the computing device 200 may be configured to render a common accessibility curve containing graphical elements which simultaneously illustrate effects of the corresponding ACL rule as it applies to either respective direction, e.g. a first graphical element which illustrates that inbound traffic is blocked or allowed, and a second graphical element which simultaneously illustrates that outbound traffic is blocked or allowed.

Similarly, by way of further non-limiting example, when the ACL parameter segment 842 corresponding to the ACL parameter related to local subnet 157.547.2.0 is selected, the computing device 200 may dynamically render accessibility curve 856, which illustrates graphically that remote subnet 192.168.3.0 corresponding to ACL parameter segment 820, and local subnet 157.547.2.0 corresponding to ACL parameter segment 842, are commonly defined in an ACL rule 015 of the firewall configuration 120, shown in FIG. 12. As in the above example, the accessibility curve 856 may be rendered as an arrow with arrowhead 858 ending at ACL parameter segment 820 indicating that the corresponding ACL rules relates to traffic from local subnet 157.547.2.0 to remote subnet 192.168.3.0, i.e. to outbound traffic 810. The options described in the example above may also apply here. For instance, as in the example above, the accessibility curve 862 may be graphically rendered so as to illustrate whether the corresponding ACL rule allows or blocks such traffic, e.g. by rendering the arrow in a first colour, e.g. green, if such traffic is allowed, or in a second colour, e.g. red, if such traffic is blocked. While not necessary, and as shown, multiple ACL parameter segments 812 may be rendered for a particular ACL parameter, for example ACL parameter segments 840, 842 which both relate to local subnet 157.547.2.0. This may be done to enhance clarity of the related ACL rules, or to facilitate selection of the particular ACL parameter segment by the user.

The computing device 200 including the dynamic accessibility diagram generation module 299 may be further configured responsive to selection of an ACL parameter segment 812 to generate and display in the display 210 a dialogue box, or other information box, containing information based on the corresponding ACL rule 905. For example, selection of ACL parameter segment 824 may cause generation and display of a graphic substantially similar to the drawing illustrating ACL rule 913 as shown in FIG. 11, and selection of ACL parameter segment 842 may cause generation and display of a graphic substantially similar to the drawing illustrating ACL rule 915 as shown in FIG. 12.

As noted above, when the network 100 has nested security enclaves 125, each may be represented by a corresponding pair of concentric rings 802, as particularly shown in FIG. 7, and the configuration, composition, and dynamic operation of the dynamic accessibility diagram 800 in the display 210 using the user interface 230 as described above may apply to each such pair of concentric rings 802 corresponding to the firewall 115 defining the corresponding enclave 125.

The computing device 200 including the dynamic accessibility diagram generation module 299 may be configured to generate the dynamic accessibility diagram 800 in the display 210 in a number of different ways, with the ACL parameter segments 812 particularly ordered in order to facilitate visual understanding of the network security configuration of the computer network 100, including the effect of the firewalls 115 visualized in the dynamic accessibility diagram 800. Such ordering may be dynamic, and responsive to selections or other actions by a user using the display 210 using the user interface 230, inasmuch as the ordering of the ACL parameters segments 812 of a given pair of concentric rings 802 which optimally facilitates visual understanding of the network security configuration may be different depending on such selections or other user actions.

For example, the ACL parameter segments 812 of the outer concentric ring 804 and/or the inner concentric ring 806 may be ordered such that the ACL parameter segments 812 corresponding to a VLAN are assembled in an arc segment of the ring. Thus, more generally, the outer concentric ring 804 and/or the inner concentric ring 806 may be ordered so as to group together circumferentially the ACL parameter segments 812 corresponding to different respective VLANs defined by the corresponding firewall configuration 120. Doing so may optimally enable a user dynamically interacting with the dynamic accessibility diagram 800 using the display 210 and the user interface 230, as described above, to recognize which part of the outer concentric ring 804 and/or the inner concentric ring 806 relates to a particular VLAN of interest, thereby facilitating selection of ACL parameter segments 812 related to that VLAN.

While the ordering of the ACL parameter segments 812 of the outer concentric ring 804 and/or the inner concentric ring 806 may be fixed, it may also be dynamic depending on selections made by the user 202. For example, and with reference to FIG. 9, as described above selection of a particular ACL parameter segment 812 on the outer concentric ring 804 may cause the computing device 200 including the dynamic accessibility diagram generation module 299 to render one or more accessibility curves 850 joined to one or more ACL parameter segments 812 on the inner concentric ring 806, or vice versa. It may be the case that, given a current ordering of the ACL parameter segments 812 of the inner concentric ring 806, for example, selection of a particular ACL parameter segment 812 on the outer concentric ring 804 may cause the rendering of one or more accessibility curves 850 joining the selected ACL parameter segment 812 to corresponding ACL parameter segments 812 on the inner concentric ring 806 that are circumferentially spaced from the selected ACL parameter segment 812, and which may be circumferentially spaced from each other, e.g. while one or more such corresponding ACL parameter segments 812 radially opposes, or is spaced circumferentially proximally, the selected ACL parameter segment 812, one or more such corresponding ACL parameter segments 812 may be spaced circumferentially distally the selected ACL parameter segment 812, and may even be positioned diametrically opposite the selected ACL parameter segment 812. Such an arrangement may not optimally visually illustrate the corresponding ACL rules 905. Accordingly, responsive to selection of the selected ACL parameter segment 812, the computing device 200 including the dynamic accessibility diagram generation module 299 may be operative to re-order the ACL parameter segments 812 of the inner concentric ring 806 circumferentially in order to assemble the corresponding ACL parameter segments 812 in an arc radially opposite, or more circumferentially proximal, the selected ACL parameter segment 812, thereby more optimally and clearly graphically rendering the accessibility curves 850 joining the one or more ACL parameter segments 812 respectively on the outer concentric ring 804 and the inner concentric ring 806. Alternatives are possible. For example, the ACL parameter segments 812 may be re-ordered to maintain the internal circumferential order of ACL parameter segments 812 corresponding to an affected VLAN, while rotating together all of the ACL parameter segments 812 corresponding to the VLAN, so as to bring the corresponding ACL parameter segments 812 in radial opposition, or more circumferentially proximal, the selected ACL parameter segment 812. While the above examples involved selection of an ACL parameter segment 812 of the outer concentric ring 804, and re-ordering of the ACL parameter segments 812 of the inner concentric ring 806, the sample principles apply, mutatis mutandis, where an ACL parameter segment 812 of the inner concentric ring 806 is selected. Moreover, the computing device 200 including the dynamic accessibility diagram generation module 299 may be operative to re-order the ACL parameter segments 812 or either or both of the outer concentric ring 804 and the inner concentric ring 806 responsive to a selection of an ACL parameter segment 812 of either of the outer concentric ring 804 and the inner concentric ring 806.

The computing device 200 including the dynamic accessibility diagram generation module 299 may be further configured to render in the dynamic accessibility diagram 800 graphical representations of actual data traffic between nodes, information about which may be stored in the traffic data structure 285, and obtained by the computing device 200 substantially as described above. In the such, the traffic flows may be rendered in the dynamic accessibility diagram 800 in a substantially similar manner as the accessibility curves 850 described above, including the operation of the computer device 200 in generating the accessibility curves 850, and the options of generation and presentation described above. The accessibility curves 850 and traffic curves may be rendered in the dynamic accessibility diagram 800 together, or separately, and the computing device 200 including the dynamic accessibility diagram generation module 299 may be further configured to receive from a user 202 using the user interface 230 a selection to render at least one of, or both of, the accessibility curves 850 or data traffic curves. When then accessibility curves 850 and data traffic curves are rendered together in the dynamic accessibility diagram 800, they may be respectively rendered graphically in visually distinctive manners, so as to enable the user 202 viewing the dynamic accessibility diagram 800 on the display 210 readily and easily to visually distinguish the two. Any difference in a suitable graphical property is possible, and may include, for example, colour, stippling, thickness, or dynamic properties such as flashing, glowing, shimmering, or tracing (i.e. the line being animated first to appear at its origin, then growing to its destination). Other graphical static or dynamic graphical properties are possible.

Figure 13:
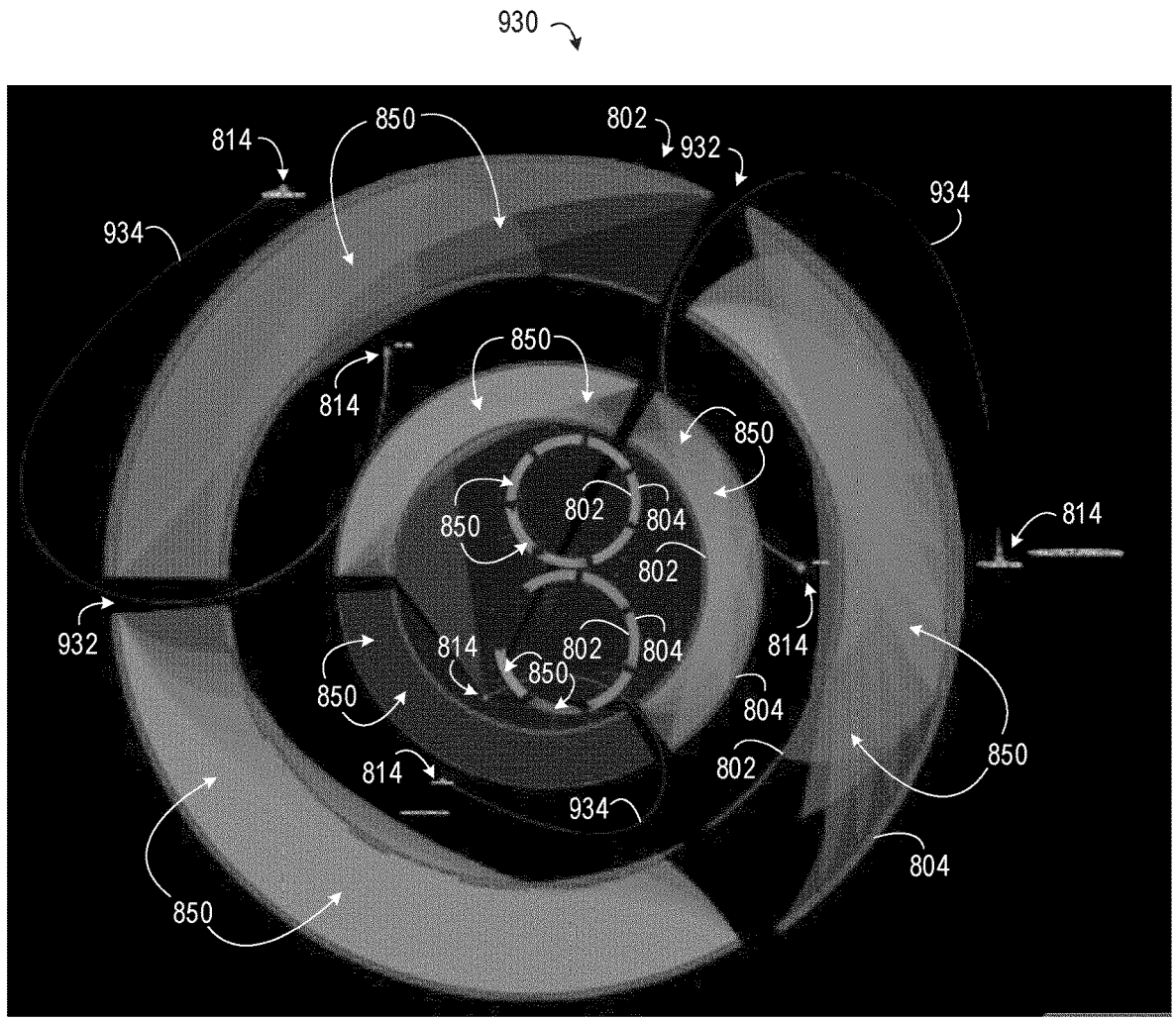
FIG. 13 is a colour screenshot of an dynamic accessibility diagram.
Figure 14:
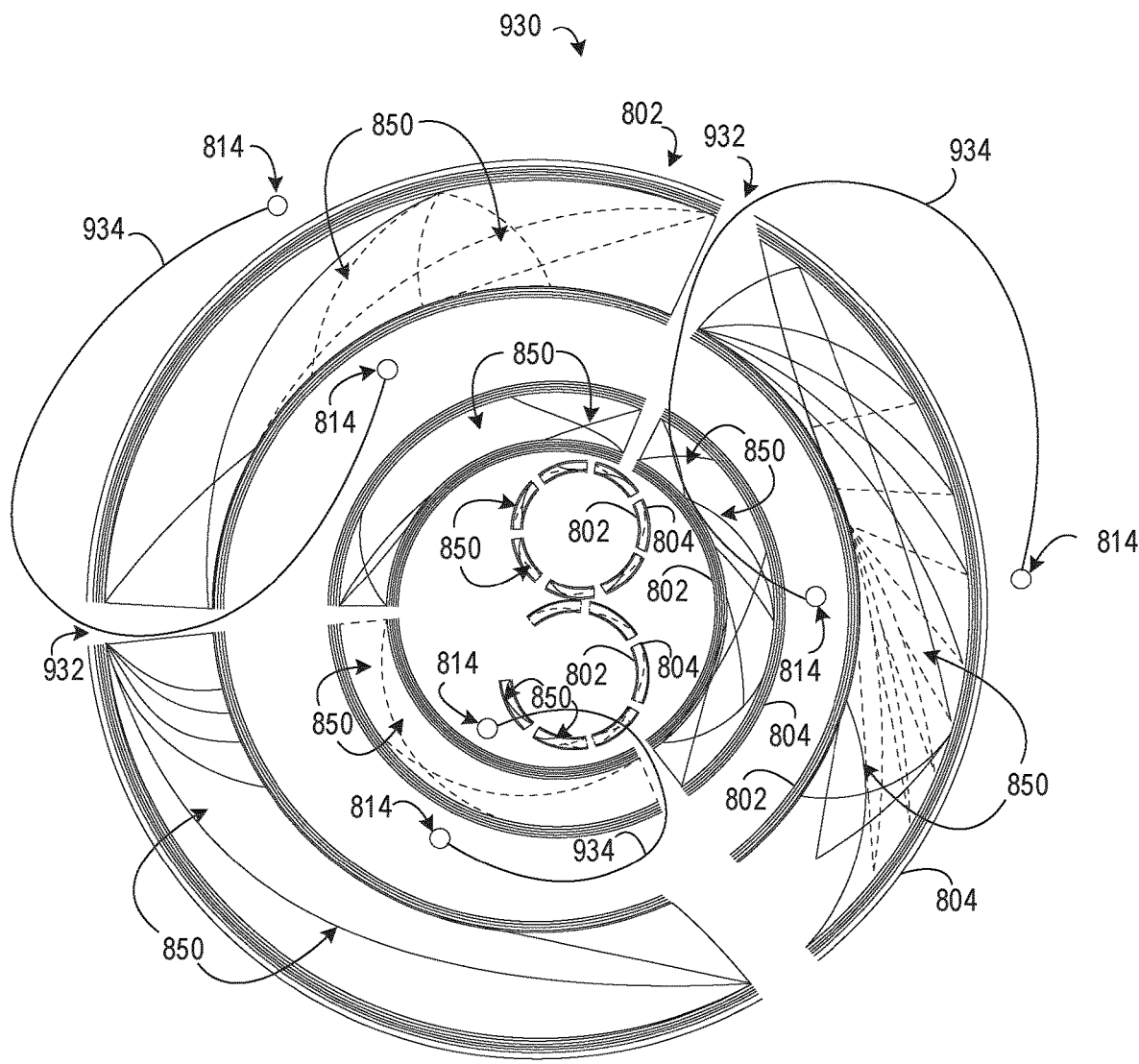
FIG. 14 is a black-and-white line drawing based on the screenshot of FIG. 13.

FIG. 13 shows a screenshot 930 of an exemplary dynamic accessibility diagram 800. FIG. 14 is a black-and-white line drawing based on the screenshot 930 of FIG. 13, wherein only a subset of the accessibility curves shown in FIG. 13 are reproduced, and wherein solid and dashed curves in FIG. 14 correspond to green and red curves in FIG. 13, respectively. Of course, these drawings cannot illustrate directly the dynamically interoperability by a user described above. It illustrates, however, multiple pairs of concentric rings 802 corresponding to multiple, corresponding embedded firewalls 115, and the accessibility curves 850 illustrating the corresponding firewall configurations 120. The screenshot 930 also illustrates that the computing device 200 including the dynamic accessibility diagram generation module 299 may be operative to render a particular pair of concentric rings 802 corresponding to a particular firewall 115 so as to contain a circumferential gap 932, and further to render a further accessibility curve 934, passing through the circumferential gap 932 and connecting two nodes 814 also rendered in the dynamic accessibility diagram 800, one radially inside and one radially outside of the concentric rings 802, thereby illustrating a gap in the firewall 115, i.e. that the corresponding firewall configuration 120 lacks any ACL rule governing communication between the two nodes 814.

Moreover, the map 500 as described above, an example of which is shown in FIG. 4, may be generated by the computing device 200 and the map generation module 295 to be operative by a user 202 using the display 210 and user interface 230 to cause the computing device 200 and the dynamic accessibility diagram generation module 299 to generate the dynamic accessibility diagram 800. For example, the display 210 and user interface 230 may be operable to select in the map 500 one or more boundary 525 graphically represents one or more network enclaves 125 defined by one or more corresponding firewall 115, and responsive to such selection, or a further input using the display 210 and user interface 230, or otherwise, to generate the dynamic accessibility diagram 800 with one or more pairs of concentric rings 802 corresponding to the same one or more firewall 115. The graphical arrangement of embedded boundaries 525 in the map 500 may match the graphical arrangement of embedded pairs of concentric rings 802 in the dynamic accessibility diagram 800, which may similar include icons 505 representing nodes 105 substantially similar to any icons 505 representing nodes 105 in the map 500, with similar placement as appropriate. In other words, the computing device 200, map generation module 295, and the dynamic accessibility diagram generation module 299 may be operative cooperatively so as to generate and render dynamic accessibility diagram 800 as graphical expansions, elaborations, magnifications—or, in colloquial terms, "zooming-in"—of boundaries 525 in the map 500.

Thus, the following are examples of solutions further to the teachings herein.

Example 1. A computer-implemented method of generating in a display of a user interface a dynamic accessibility diagram representing a firewall configuration of a firewall in a computer network, the method comprising: receiving the firewall configuration of the firewall, the firewall configuration comprising at least one access control list (ACL) rule, each ACL rule defining: a remote ACL parameter defining a remote address range outside the firewall; a local ACL parameter defining a local address range inside the firewall; and an accessibility rule defining accessibility between the remote address range and the local address range; generating in the display a pair of concentric rings representing the firewall, the pair of concentric rings comprising an outer concentric ring and an inner concentric ring each comprising at least one ACL parameter segment, each ACL parameter segment of the outer concentric ring representing the remote address range of the remote ACL parameter of at least one of the ACL rules, each ACL parameter segment of the inner concentric ring representing the local address range of the local ACL parameter of at least one of the ACL rules; and receiving via the user interface a selection of at least one ACL parameter segment as a selected ACL parameter segment; when the selected ACL parameter segment is in the outer concentric ring: determining at least one remote address range represented by the selected ACL parameter segment as a selected address range; determining at least one ACL rule as a selected ACL rule, wherein the remote ACL parameter defined by the selected ACL rule defines the selected address range; and determining the local address range of the local ACL parameter defined by the selected ACL rule as a pairing address range; when the selected ACL parameter segment is in the inner concentric ring: determining at least one local address range represented by the selected ACL parameter segment as a selected address range; determining at least one ACL rule as a selected ACL rule, wherein the local ACL parameter defined by the selected ACL rule defines the selected address range; and determining the remote address range of the remote ACL parameter defined by the selected ACL rule as a pairing address range; determining at least one ACL parameter segment as a pairing ACL parameter segment, wherein the pairing ACL parameter segment represents the pairing address range; generating in the display an accessibility curve joining the selected ACL parameter segment and the pairing ACL parameter segment, the accessibility curve graphically representing accessibility between the selected address range and the pairing address range.

Example 2. The method according to Example 1, wherein the selected ACL parameter segment is in the outer concentric ring, the pairing ACL parameter segment is in the inner concentric ring, the selected address range is the remote address range of the selected ACL rule, the pairing address range is the local address range of the selected ACL rule, wherein the accessibility curve represents accessibility between the remote address range and the local address range.

Example 3. The method according to Example 1, wherein the selected ACL parameter segment is in the inner concentric ring, the pairing ACL parameter segment is in the outer concentric ring, the selected address range is the local address range of the particular ACL rule, the pairing address range is the remote address range of the selected ACL rule, wherein the accessibility curve represents accessibility between the local address range and the remote address range.

Example 4. The method according to Example 2 or 3, wherein the accessibility curve represents accessibility of traffic from the remote address range to the local address range.

Example 5. The method according to Example 4, wherein the accessibility curve has an arrowhead at or adjacent the ACL parameter segment corresponding to the local address range.

Example 6. The method according to Example 2 or 3, wherein the accessibility curve represents accessibility of traffic from the local address range to the remote address range.

Example 7. The method according to Example 6, wherein the accessibility curve has an arrowhead at or adjacent the ACL parameter segment corresponding to the remote address range.

Example 8. The method according to any one of Examples 1 to 7, comprising generating a graphical feature of the accessibility curve based on the accessibility rule of the selected ACL rule, whereby the accessibility curve graphically represents the accessibility between the selected address range and the pairing address range.

Example 9. The method according to Example 8, wherein a colour of the accessibility curve graphically represents the accessibility between the selected address range and the pairing address range.

Example 10. The method according to Example 9, wherein the accessibility curve is rendered in a first colour when accessibility between the selected address range and the pairing address range is allowed, and the accessibility curve is rendered in a second colour when accessibility between the selected address range and the pairing address range is blocked.

Example 11. The method according to Example 10, wherein the first colour is green, and the second colour is red.

Example 12. The method according to any one of Examples 1 to 11, wherein the remote ACL parameter of the selected ACL rule further defines a remote port range, and the local ACL parameter of the selected ACL rule further defines a local port range.

Example 13. The method according to Example 12, wherein the selected ACL parameter segment or the pairing ACL parameter segment further graphically represents the remote port range or the local port range. Example 14. The method according to any one of Examples 1 to 13, wherein receiving the firewall configuration of the firewall comprises: receiving a plurality of standardized firewall configurations corresponding respectively to a plurality of network appliances in the computer network; and processing the plurality of standardized firewall configurations to identify network security enclaves; wherein the firewall configuration is a selected one of the plurality of standardized firewall configurations.

Example 15. The method according to Example 14, wherein receiving the plurality of standardized firewall configurations corresponding respectively to the plurality of network appliances comprises: accessing each of the network appliances to retrieve an appliance security configuration of the network appliance, the appliance security configuration comprising an appliance firewall configuration, thereby providing a respective plurality of appliance firewall configurations; and processing each of the appliance firewall configurations to generate a corresponding standardized firewall configuration.

Example 16. The method according to Example 15, wherein accessing each of the network appliances to retrieve the appliance security configuration of the network appliance comprises accessing at least one of the network appliances over the computer network to retrieve the appliance security configuration of the network appliance.

Example 17. The method according to Example 15 or 16, wherein first ones of the plurality of appliance firewall configurations are characterized by a first firewall configuration type different from a second firewall configuration type characterizing second ones of the plurality of appliance firewall configurations, and processing each of the appliance firewall configurations to generate the respectively corresponding standardized firewall configurations comprises: determining a firewall configuration type of the appliance firewall configuration, and processing firewall configuration parameters of the appliance firewall configuration based on an algorithm associated with the firewall configuration type to generate corresponding standardized firewall configuration parameters of the corresponding standardized firewall configuration.

Example 18. The method according to any one of Examples 14 to 17, wherein processing the plurality of standardized firewall configurations to identify network security enclaves comprises identifying corresponding groups of the network appliances accessible over the computer network via a corresponding common network appliance.

Example 19. A computing device comprising a processor, a network interface, and a memory encoding computer-executable instructions executable by the processor to perform the method according to any one of Examples 1 to 18 using the network interface.

Example 20. A non-transient computer-readable medium encoding computer-executable instructions executable by a processor to perform the method according to any one of Examples 1 to 18 using a network interface.

Any examples presented in the description are intended to be non-limiting unless explicitly indicated otherwise.

In the preceding description, for purposes of explanation, numerous details are set forth in order to provide a thorough understanding of the embodiments. It will be apparent to one skilled in the art, however, that these specific details may not be required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art.

In some instances, well-known hardware and software components, modules, and functions are shown in block diagram form in order not to obscure the invention. For example, specific details are not provided as to whether the embodiments described herein are implemented as a software routine, hardware circuit, firmware, or a combination thereof.

Some of the embodiments described herein include a processor and a memory storing computer-readable instructions executable by the processor. In some embodiments, the processor is a hardware processor configured to perform a predefined set of basic operations in response to receiving a corresponding basic instruction selected from a predefined native instruction set of codes. Each of the modules defined herein may include a corresponding set of machine codes selected from the native instruction set, and which may be stored in the memory.

Embodiments can be implemented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, optical disc, memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described embodiments can also be stored on the machine-readable medium. Software running from the machine-readable medium can interface with circuitry to perform the described tasks.

The scope of the claims should not be limited by the particular embodiments set forth herein, but should be construed in a manner consistent with the specification as a whole.

What is claimed is:

1. A computer-implemented method of generating in a display of a user interface a dynamic accessibility diagram representing a firewall configuration of a firewall in a computer network, the method comprising:

receiving the firewall configuration of the firewall, the firewall configuration comprising at least one access control list (ACL) rule, each ACL rule defining:
 a remote ACL parameter defining a remote address range outside the firewall;
 a local ACL parameter defining a local address range inside the firewall; and
 an accessibility rule defining accessibility between the remote address range and the local address range;
generating in the display a pair of concentric rings representing the firewall, the pair of concentric rings comprising an outer concentric ring and an inner concentric ring each comprising at least one ACL parameter segment, each ACL parameter segment of the outer concentric ring representing the remote address range of the remote ACL parameter of at least one of the ACL rules, each ACL parameter segment of the inner concentric ring representing the local address range of the local ACL parameter of at least one of the ACL rules; and
receiving via the user interface a selection of at least one ACL parameter segment as a selected ACL parameter segment;
when the selected ACL parameter segment is in the outer concentric ring:
 determining at least one remote address range represented by the selected ACL parameter segment as a selected address range;
 determining at least one ACL rule as a selected ACL rule, wherein the remote ACL parameter defined by the selected ACL rule defines the selected address range; and
 determining the local address range of the local ACL parameter defined by the selected ACL rule as a pairing address range;
when the selected ACL parameter segment is in the inner concentric ring:
 determining at least one local address range represented by the selected ACL parameter segment as a selected address range;
 determining at least one ACL rule as a selected ACL rule, wherein the local ACL parameter defined by the selected ACL rule defines the selected address range; and
 determining the remote address range of the remote ACL parameter defined by the selected ACL rule as a pairing address range;
determining at least one ACL parameter segment as a pairing ACL parameter segment, wherein the pairing ACL parameter segment represents the pairing address range;
generating in the display an accessibility curve joining the selected ACL parameter segment and the pairing ACL parameter segment, the accessibility curve graphically representing accessibility between the selected address range and the pairing address range.

2. The method according to claim 1, wherein the selected ACL parameter segment is in the outer concentric ring, the pairing ACL parameter segment is in the inner concentric ring, the selected address range is the remote address range of the selected ACL rule, the pairing address range is the local address range of the selected ACL rule, wherein the accessibility curve represents accessibility between the remote address range and the local address range.

3. The method according to claim 1, wherein the selected ACL parameter segment is in the inner concentric ring, the pairing ACL parameter segment is in the outer concentric ring, the selected address range is the local address range of the particular ACL rule, the pairing address range is the remote address range of the selected ACL rule, wherein the accessibility curve represents accessibility between the local address range and the remote address range.

4. The method according to claim 2, wherein the accessibility curve represents accessibility of traffic from the remote address range to the local address range.

5. The method according to claim 4, wherein the accessibility curve has an arrowhead at or adjacent the ACL parameter segment corresponding to the local address range.

6. The method according to claim 2, wherein the accessibility curve represents accessibility of traffic from the local address range to the remote address range.

7. The method according to claim 6, wherein the accessibility curve has an arrowhead at or adjacent the ACL parameter segment corresponding to the remote address range.

8. The method according to claim 1, comprising generating a graphical feature of the accessibility curve based on the accessibility rule of the selected ACL rule, whereby the accessibility curve graphically represents the accessibility between the selected address range and the pairing address range.

9. The method according to claim 8, wherein a colour of the accessibility curve graphically represents the accessibility between the selected address range and the pairing address range.

10. The method according to claim 9, wherein the accessibility curve is rendered in a first colour when accessibility between the selected address range and the pairing address range is allowed, and the accessibility curve is rendered in a second colour when accessibility between the selected address range and the pairing address range is blocked.

11. The method according to claim 10, wherein the first colour is green, and the second colour is red.

12. The method according to claim 1, wherein the remote ACL parameter of the selected ACL rule further defines a remote port range, and the local ACL parameter of the selected ACL rule further defines a local port range.

13. The method according to claim 12, wherein the selected ACL parameter segment or the pairing ACL parameter segment further graphically represents the remote port range or the local port range.

14. The method according to claim 1, wherein receiving the firewall configuration of the firewall comprises:
receiving a plurality of standardized firewall configurations corresponding respectively to a plurality of network appliances in the computer network; and
processing the plurality of standardized firewall configurations to identify network security enclaves;
wherein the firewall configuration is a selected one of the plurality of standardized firewall configurations.

15. The method according to claim 14, wherein receiving the plurality of standardized firewall configurations corresponding respectively to the plurality of network appliances comprises:
accessing each of the network appliances to retrieve an appliance security configuration of the network appliance, the appliance security configuration comprising an appliance firewall configuration, thereby providing a respective plurality of appliance firewall configurations; and
processing each of the appliance firewall configurations to generate a corresponding standardized firewall configuration.

16. The method according to claim 15, wherein accessing each of the network appliances to retrieve the appliance security configuration of the network appliance comprises accessing at least one of the network appliances over the computer network to retrieve the appliance security configuration of the network appliance.

17. The method according to claim 15, wherein first ones of the plurality of appliance firewall configurations are characterized by a first firewall configuration type different from a second firewall configuration type characterizing second ones of the plurality of appliance firewall configurations, and processing each of the appliance firewall configurations to generate the respectively corresponding standardized firewall configurations comprises:
determining a firewall configuration type of the appliance firewall configuration, and processing firewall configuration parameters of the appliance firewall configuration based on an algorithm associated with the firewall configuration type to generate corresponding standardized firewall configuration parameters of the corresponding standardized firewall configuration.

18. The method according to claim 14, wherein processing the plurality of standardized firewall configurations to identify network security enclaves comprises identifying corresponding groups of the network appliances accessible over the computer network via a corresponding common network appliance.

19. A computing device comprising a processor, a network interface, and a memory encoding computer-executable instructions executable by the processor to perform the method according to claim 1 using the network interface.

20. A non-transient computer-readable medium encoding computer-executable instructions executable by a processor to perform the method according to claim 1 using a network interface.

* * * * *